US012277253B2

(12) United States Patent
Omino et al.

(10) Patent No.: US 12,277,253 B2
(45) Date of Patent: Apr. 15, 2025

(54) INFORMATION PROCESSING APPARATUS, INFORMATION PROCESSING SYSTEM, AND NON-TRANSITORY COMPUTER READABLE MEDIUM

(71) Applicant: KABUSHIKI KAISHA TOSHIBA, Tokyo (JP)

(72) Inventors: Tsukasa Omino, Ota Tokyo (JP); Tomoko Yonemura, Kawasaki Kanagawa (JP); Misaki Komatsu, Yokohama Kanagawa (JP); Yoshikazu Hanatani, Komae Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 244 days.

(21) Appl. No.: 17/931,402

(22) Filed: Sep. 12, 2022

(65) Prior Publication Data

US 2023/0118762 A1    Apr. 20, 2023

(30) Foreign Application Priority Data

Oct. 15, 2021    (JP) .................................. 2021-169886

(51) Int. Cl.
*G06F 21/64*    (2013.01)
*G06F 16/23*    (2019.01)
*G06F 21/44*    (2013.01)

(52) U.S. Cl.
CPC .......... *G06F 21/64* (2013.01); *G06F 16/2365* (2019.01); *G06F 21/44* (2013.01); *G06F 2221/2137* (2013.01)

(58) Field of Classification Search
CPC ...... G06F 21/64; G06F 16/2365; G06F 21/44; G06F 2221/2137
See application file for complete search history.

(56) References Cited

U.S. PATENT DOCUMENTS 7,346,412 B2    3/2008   Tokorozuki et al.
9,268,969 B2 *  2/2016   Gault .................... G06F 21/645
(Continued)

FOREIGN PATENT DOCUMENTS

JP    2009-245319 A    10/2009
JP    2020-77347 A     5/2020
(Continued)

OTHER PUBLICATIONS

Japan Patent Office, Office Action in JP App. No. 2021-169886, 4 pages, and machine translation, 8 pages (Sep. 27, 2024).

*Primary Examiner* — Matthew Smithers
(74) *Attorney, Agent, or Firm* — Finnegan, Henderson, Farabow, Garrett & Dunner, LLP

(57) ABSTRACT

An information processing apparatus includes: a receiver to receive a verification request of consistency for an object of verification being a handling consent record or a handling execution record related to a handling of data; a searcher to search a storage system storing at least one handling consent record and at least one handling execution record on a basis of the verification request, and acquire the handling consent record or the handling execution record which is the object of verification and a handling consent record and a handling execution record related to the object of verification; a period calculator to calculate at least one of a consent period or a non-consent period on a basis of acquired handling consent record(s); and a verifier to verify the consistency on a basis of acquired handling execution record(s) and at least one of the consent period or the non-consent period.

19 Claims, 15 Drawing Sheets

(56) References Cited

U.S. PATENT DOCUMENTS

| | | | |
|---|---|---|---|
| 9,934,544 B1* | 4/2018 | Whitfield | G06Q 50/265 |
| 10,163,153 B1* | 12/2018 | Constantine | G06Q 40/00 |
| 11,019,065 B2* | 5/2021 | Jacobs | H04L 63/104 |
| 11,316,957 B2 | 4/2022 | Ogura | |
| 11,361,057 B2* | 6/2022 | Barday | G06F 21/6245 |
| 11,928,241 B2* | 3/2024 | Bella | H04W 12/10 |
| 12,086,283 B2 | 9/2024 | Unagami et al. | |
| 12,130,939 B2* | 10/2024 | Qu | G06Q 10/06315 |
| 2015/0213195 A1* | 7/2015 | Blechman | G16H 10/60 |
| | | | 705/51 |
| 2019/0005210 A1* | 1/2019 | Wiederspohn | G06F 21/31 |
| 2019/0348158 A1* | 11/2019 | Livesay | H04L 9/3239 |
| 2019/0392162 A1* | 12/2019 | Stern | G06F 21/6245 |
| 2020/0004988 A1* | 1/2020 | Brannon | G06F 21/32 |
| 2020/0153637 A1 | 5/2020 | Sakai et al. | |
| 2020/0175206 A1* | 6/2020 | Brannon | G06F 21/6245 |
| 2020/0213254 A1* | 7/2020 | Nigam | G06Q 10/10 |
| 2020/0336695 A1* | 10/2020 | Predmore | G07C 5/008 |
| 2020/0356695 A1* | 11/2020 | Brannon | G06F 16/2379 |
| 2020/0364705 A1* | 11/2020 | Yadav | H04L 9/3247 |
| 2021/0042294 A1* | 2/2021 | Srivastava | G06F 16/2379 |
| 2021/0089517 A1 | 3/2021 | Suga | |
| 2021/0149982 A1* | 5/2021 | Jones | G06F 16/951 |
| 2021/0150052 A1* | 5/2021 | Garcia | G06Q 50/18 |
| 2021/0158462 A1* | 5/2021 | Kuhlman | G06F 16/2379 |
| 2021/0192075 A1* | 6/2021 | Sweeney | G06F 21/6245 |
| 2021/0297399 A1* | 9/2021 | Brannon | G06F 16/215 |
| 2021/0334402 A1* | 10/2021 | Detchemendy | H04L 63/108 |
| 2021/0350021 A1* | 11/2021 | Wang | H04L 9/3213 |
| 2021/0390196 A1* | 12/2021 | Lavine | H04L 63/102 |
| 2022/0058282 A1* | 2/2022 | Ricotta, Jr. | G16H 10/20 |
| 2022/0141197 A1 | 5/2022 | Yonemura et al. | |
| 2022/0147651 A1 | 5/2022 | Omino et al. | |
| 2022/0147655 A1 | 5/2022 | Komatsu et al. | |
| 2022/0173913 A1* | 6/2022 | Lloyd | H04L 9/0841 |
| 2022/0222718 A1* | 7/2022 | Nakashima | G06Q 30/0278 |
| 2022/0237320 A1 | 7/2022 | Nakagawa et al. | |
| 2022/0300972 A1* | 9/2022 | Davies | G06Q 20/3825 |
| 2023/0267474 A1* | 8/2023 | Yoon | G06F 21/6218 |
| | | | 705/342 |
| 2023/0297716 A1* | 9/2023 | Bella | H04L 9/50 |
| | | | 726/1 |

FOREIGN PATENT DOCUMENTS

| | | |
|---|---|---|
| JP | 2020-98972 A | 6/2020 |
| JP | 2021-48546 A | 3/2021 |
| JP | 2021-114141 A | 8/2021 |
| JP | 2022-74414 A | 5/2022 |
| JP | 2022-75328 A | 5/2022 |
| JP | 2022-75337 A | 5/2022 |
| WO | WO 2005/045907 A1 | 5/2005 |
| WO | WO 2020/122095 A1 | 6/2020 |
| WO | WO 2020/240729 A1 | 12/2020 |
| WO | WO 2021/059434 A1 | 4/2021 |
| WO | WO 2021/124568 A1 | 6/2021 |

* cited by examiner

F.I.G. 12

INFORMATION PROCESSING APPARATUS, INFORMATION PROCESSING SYSTEM, AND NON-TRANSITORY COMPUTER READABLE MEDIUM

CROSS REFERENCE TO RELATED APPLICATIONS

This application is based upon and claims the benefit of priority from the prior Japanese Patent Application No. 2021-169886, filed on Oct. 15, 2021, the entire contents of which are incorporated herein by reference.

FIELD

Embodiments described herein relate generally to an information processing apparatus, an information processing system, and a non-transitory computer readable medium.

BACKGROUND

According to the law related to the protection of personal information (hereinafter, the Personal Information Protection Law), for a personal information handling business operator to provide personal data to a third party, the business is requested to acquire consent in advance from the person in question, that is, the owner of the personal data. The personal information handling business operator creates a record related to the consent, and confirms the existence or non-existence of the consent when providing personal data to a third party.

Also, to make the flow of the disclosure of personal data traceable, when providing personal data to a third party, the personal information handling business operator is requested to make a record related to the disclosure and retain the record for a certain period. For example, the personal information handling business operator records an indication that personal data has been provided, together with information such as the name of the owner, the consent of the owner, the category of personal data, and the name of the recipient third party. Additionally, for example, the third party provided with the personal data, or in other words, the apparatus of the party using the personal data, checks the name of the personal information handling business operator from which the data was provided and the circumstances by which the personal information handling business operator acquired the provided data, and also makes a record of receiving the personal data together with the name and the circumstances. It is desirable to verify the consistency of such records with regard to whether the records have been created properly, such as whether a record of consent was made before a record of the disclosure of personal data was made, for example.

DETAILED DESCRIPTION

According to one embodiment, an information processing apparatus includes: a receiver configured to receive a verification request of consistency for an object of verification, the object of verification being a handling consent record or a handling execution record related to a handling of data; a searcher configured to search a storage system storing at least one handling consent record and at least one handling execution record on a basis of the verification request, and acquire the handling consent record or the handling execution record which is the object of verification and a handling consent record and a handling execution record related to the object of verification; a period calculator configured to calculate at least one of a consent period or a non-consent period on a basis of at least one acquired handling consent record; and a verifier configured to verify the consistency on a basis of at least one acquired handling execution record and at least one of the consent period or the non-consent period.

Hereinafter, embodiments of the present invention will be described with reference to the drawings.

Figure 1:
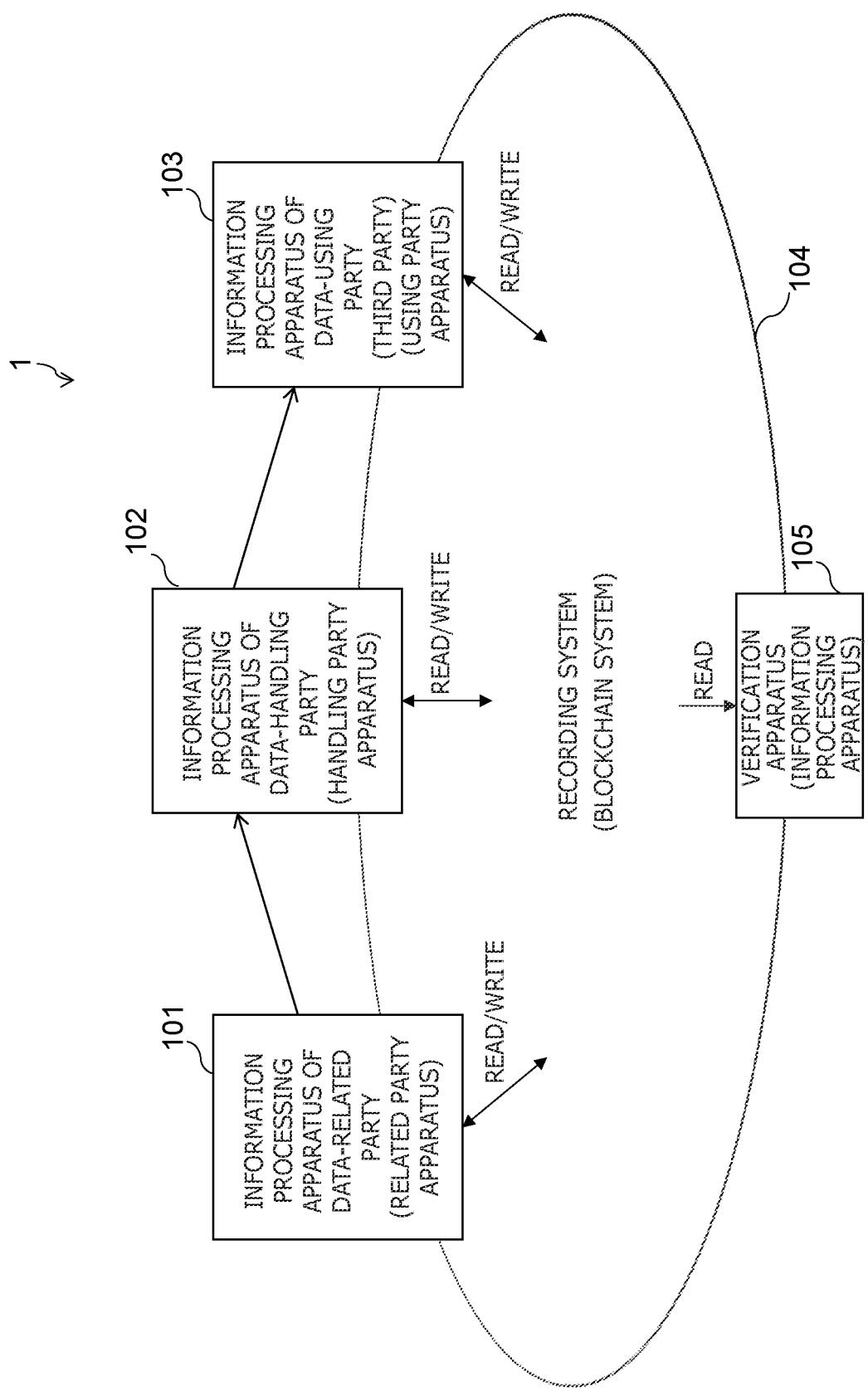
FIG. 1 is a block diagram illustrating an example of an information processing system according to an embodiment of the present invention.

FIG. 1 is a block diagram illustrating an example of an information processing system according to an embodiment of the present invention. An information processing system according to the present embodiment is provided with an information processing apparatus 101 of a data-related party, an information processing apparatus 102 of a data-handling party, an information processing apparatus 103 of a data-using party as a third party that is neither the data-related party nor the data-handling party, a blockchain system 104, and a verification apparatus 105. The verification apparatus 105 is an information processing apparatus that verifies various records written to the blockchain system 104. In FIG. 1, the verification apparatus 105 is illustrated as a separate apparatus from the related party apparatus 101, the handling party apparatus 102, and the using party apparatus 103, but the verification apparatus 105 may also be the same apparatus as at least one of the related party apparatus 101, the handling party apparatus 102, and the using party apparatus 103.

Note that for convenience, the information processing apparatus 101 of the data-related party, the information processing apparatus 102 of the data-handling party, and the information processing apparatus 103 of the third party are hereinafter referred to as the related party apparatus 101, the handling party apparatus 102, and the using party apparatus 103, respectively. Note that the related party apparatus 101, the handling party apparatus 102, and the using party apparatus 103 are not limited to a single apparatus each, and a plurality of each apparatus may exist.

In the information processing system according to the present embodiment, the handling party apparatus 102 handles data of the data-related party. Although a variety of types of handling are anticipated, one type of handling is that the handling party apparatus 102 may transmit the data to the using party apparatus 103. In other words, the data-handling party may provide the data of the data-related party to a third party, namely the data-using party. For example, the personal information handling business operator (PDS business) that manages a personal data store (PDS) retaining personal data is the data-handling party, and the PDS business conceivably provides personal data to third parties after acquiring consent from the person in question or a representative. Note that in the case where the data-handling party does not collect data itself but acquires data from the data-related party and provides the data to the data-using party, the data-handling party may be considered to be a first recipient of the data, and the data-using party may be considered to be a second recipient of the data.

Note that the data-related party, the data-handling party, and the data-using party are not limited to specific persons, and may be individuals or corporations. Also, the data-related party simply means the person associated with the data, and is not limited to a specific person. For example, the data-related party may be a consenting party that consents to the handling of data by the data-handling party, a holder of the data, or a representative of the holder. In addition, the data-related party may also be a person specified by the data. For example, the data indicates information such as address, gender, and age, and a person specified by the address or the like may be treated as the data-related party. In this way, the data-related party is anticipated to be a party related to consent with respect to the data or to the data itself.

Furthermore, the type of data handled in the present embodiment, the method of transmitting and receiving data, and the like are not limited to a specific type or method. For example, the data in question may be personal data or industrial data.

Also, in the present embodiment, a log with respect to the data is written to a blockchain provided by the blockchain system 104. The granting of consent to the handling of data, the execution of the handling, the usability of the data as a result of executing the handling, and the like are written to the blockchain. For example, the disclosure of the data to a third party and actions such as acquiring, receiving, analyzing, editing, or erasing the data may be written to the blockchain. In the present embodiment, data acquisition means that the data-handling party acquires data from the data-related party, and data receipt means that data is acquired from the data-handling party. However, acquisition and receipt may also be unified into either one.

By leaving such a record with respect to the data, the traceability of the data is secured. For example, in the case where the data is provided to a third party, the data-related party is able to check which using party was provided with the data and the consent used as the basis for providing the data. Also, by managing the record with the blockchain, resistance against tampering with the record can be improved.

The blockchain is managed in a distributed manner by information processing apparatuses belonging to a P2P network associated with the blockchain. The P2P network may also be considered to be a network for consensus-forming with respect to the content written to blocks in the blockchain. It is sufficient for the related party apparatus 101, the handling party apparatus 102, and the using party apparatus 103 to he capable of writing a record related to data to the blockchain, either directly or indirectly. In other words, the related party apparatus 101, the handling party apparatus 102, and the using party apparatus 103 may belong to the blockchain system 104, or in other words the P2P network associated with the blockchain, and write to blocks in the blockchain directly. Alternatively, the related party apparatus 101, the handling party apparatus 102, and the using party apparatus 103 may not belong to the blockchain system 104, and may request an information processing apparatus belonging to the blockchain system 104 to write the record to the blockchain. In other words, writing to the blockchain may also be achieved indirectly by sending the desired record to be written to an information processing apparatus belonging to the blockchain.

In addition, the related party apparatus 101, the handling party apparatus 102, and the using party apparatus 103 may write to blocks in the blockchain individually, or one of the apparatuses may write to blocks in the blockchain as a representative. For example, by causing the related party apparatus 101 to write a record related to consent to a block in the blockchain and causing the handling party apparatus 102 to monitor the blockchain, the consent may be recognized. Alternatively, the handling party apparatus 102 may acquire information indicating consent from the related party apparatus 101 through a medium other than the blockchain, such as email or a web page for example, and write a record related to the consent to a block in the blockchain on the basis of the information.

Note that the method of writing to the blockchain may use known technology, and is not described in detail in the present embodiment. For example, a digital signature may be attached to a written record to indicate security. The digital signature may be generated from a private key of the related party apparatus 101 or from a private key of the handling party apparatus 102. Additionally, because managing private keys securely is relatively difficult for the data-related party, the management of private keys may be entrusted to the data-handling party in some cases. Consequently, the handling party apparatus 102 may also generate a digital signature from a private key of the related party apparatus 101 instead of the related party apparatus 101, and transmit the generated digital signature to the related party apparatus 101.

The verification apparatus 105 receives a verification request regarding the consistency of any record written to the blockchain from another apparatus, searches the blockchain for the record on the basis of the verification request, and verifies the consistency of the record. The requester apparatus that issues the verification request may be the related party apparatus 101, the handling party apparatus 102, the using party apparatus 103, or an apparatus different from the above. The verification apparatus 105 may also not belong to the blockchain system 104 and request an information processing apparatus belonging to the blockchain system 104 to search the blockchain. In FIG. 1, the verification apparatus 105 is illustrated as a separate apparatus from the related party apparatus 101, the handling party apparatus 102, and the using party apparatus 103, but at least one of the related party apparatus 101, the handling party apparatus 102, and the using party apparatus 103 may also serve as the verification apparatus 105.

Note that the acting parties taking part in the information processing system are not limited to the acting parties illustrated in FIG. 1, and other acting parties may also exist. For example, it is also anticipated that the data of the related party may also be retained by a data-managing party different from the data-handling party. In this case, it is sufficient for the information processing apparatus of the data-managing party to acquire the data from the related party apparatus 101, and for the information processing apparatus of the data-managing party to transmit the data to the using party apparatus 103 according to an instruction received from the handling party apparatus 102. In other words, the information processing apparatus of the data-managing party may function as a part of the handling party apparatus 102.

Figure 2:
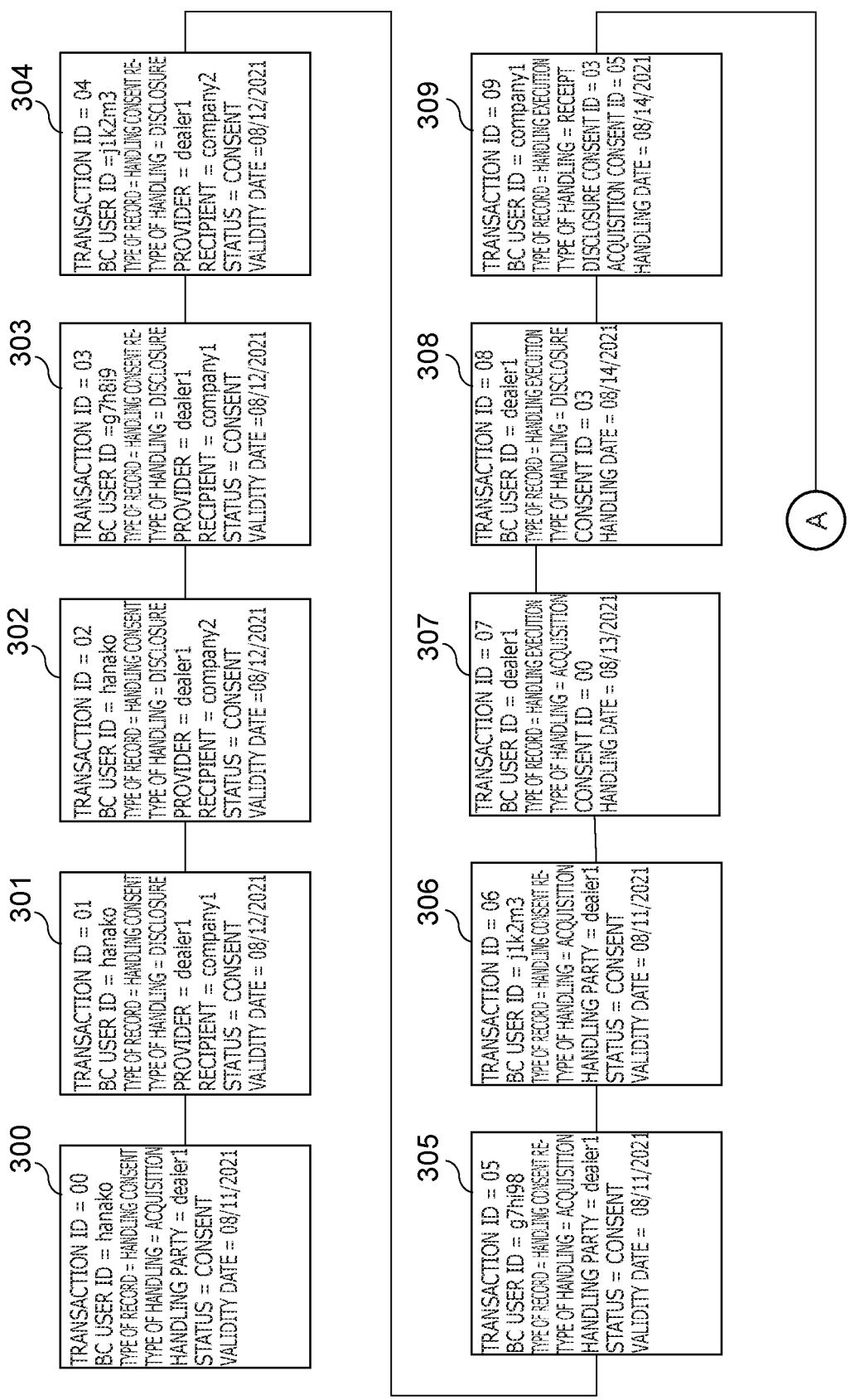
FIG. 2 is a diagram illustrating an example of a blockchain generated by a process according to the present embodiment.
Figure 3:
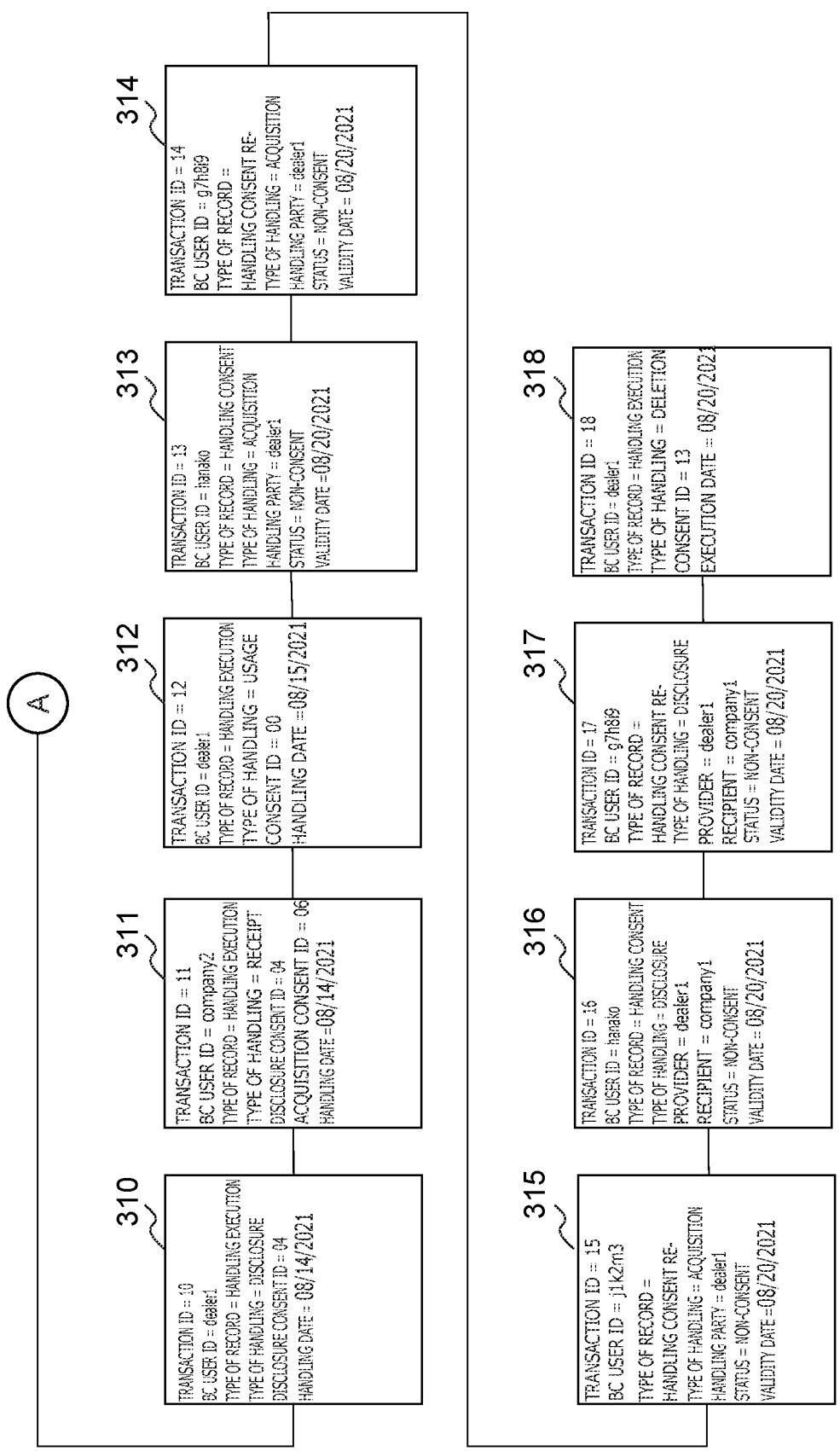
FIG. 3 is a continuation of FIG. 2.

FIG. 2 is a diagram illustrating an example of a blockchain according to the present embodiment. FIG. 3 is a continuation of FIG. 2. Hereinafter, the blockchain in FIGS. 2 and 3 will be described, followed by a description of a process for generating the blockchain and a description of the verification apparatus 105 that verifies records written to the blockchain.

FIGS. 2 and 3 illustrate a blockchain including blocks 300 to 318. Records related to data, or more precisely, records related to the handling of data, are written to the blockchain. A transaction ID indicated in each of the blocks 300 to 318 is an identifier of the process (transaction) indicated by each record. A BC user ID indicated in each of the blocks 300 to 318 means a user ID for the blockchain, and indicates the acting party of the process indicated by each record.

The block 300 indicates a record (handling consent record) in which the data-related party with the BC user ID "hanako" has consented to the handling of data acquisition by the data-handling party with the BC user ID "dealer1". The consent is valid from Aug. 11, 2021. The type of handling is "acquisition", and the type of record is "handling consent". Also, the status is "consent". Here, "hanako" may be a real name or a pseudonym. The present embodiment assumes that a pseudonym is used.

In the present embodiment, data acquisition may include the retention of acquired data. In other words, consenting to data acquisition also means consenting to the retention of acquired data. However, data acquisition and the retention of acquired data may also be defined separately as different types of handling.

The block 301 also indicates a handling consent record. The block 301 indicates that "hanako" has given consent related to disclosure such that data may be provided if the data provider is "dealer1" and the data recipient is the data-using party with the BC user ID "company1". This may also be considered to be a consent to data receipt by "company1". In this record, the type of handling is "disclosure", and the type of record is "handling consent". Similarly, the block 302 indicates that "hanako" has given consent such that data may be disclosed if the data provider is "dealer1" and the data-using party is "company2". This may also be considered to be a consent to data receipt by "company2". Like the block 301, the type of handling is "disclosure", and the type of record is "handling consent".

The blocks 303 and 304 indicate the same records (handling consent records) as the blocks 301 and 302, respectively, except that the BC user ID is different. The BC user IDs indicated in the blocks 303 and 304 have been changed according to the using party (recipient). In other words, the BC user IDs are set to identifiers exclusive to each using party. The BC user IDs are identifiers that uniquely correspond to the combination of the related party and the using party, and the data-related party "hanako" is expressed by a different identifier depending on the using party. Even if the using party is the same, the identifier is different depending on the related party that the using party is combined with. A handling consent record in which the BC user ID of the handling consent record has been rewritten with an identifier for the using party corresponding to the related party will be referred to as a handling consent re-record. Accordingly, the type of record is "handling consent re-" for both the block 303 and the block 304.

The blocks 305 and 306 indicate the same handling consent record as the block 300, except that the BC user ID is different. Like the blocks 303 and 304, the BC user IDs indicated in the blocks 305 and 306 are identifiers that uniquely correspond to the combination of the related party and the using party.

The block 307 is a handling execution record related to data acquisition. The record indicates that the acting party of acquisition is "dealer1", and that data acquisition occurred on Aug. 13, 2021. The type of record is "handling execution", and the type of handling is "acquisition". A handling execution record for which the type of handling is "acquisition" may also be referred to as a handling execution record related to acquisition or a handling execution record for acquisition.

The block 308 is a handling execution record related to data disclosure by "dealer1". The type of record is "handling execution", and the type of handling is "disclosure". A handling execution record for which the type of handling is "disclosure" may also be referred to as a handling execution record related to disclosure or a handling execution record for disclosure.

The block 309 is a usage record related to data receipt by "company1", which corresponds to the data disclosure by "dealer1". The party that provides the data is known from the provider "dealer1" of the disclosure consent ID=03 that is referenced. The type of record is "handling execution", and the type of handling is "receipt". A handling execution record for which the type of handling is "receipt" may also be referred to as a handling execution record related to receipt or a handling execution record for receipt.

Similarly, the block 310 is a handling execution record related to data disclosure by "dealer1", and the block 311 is a usage record related to data receipt by "company2" corresponding to the data disclosure by "dealer1". The blocks 310 and 311 contain content similar to the blocks 308 and 309, respectively, but information such as the disclosure consent ID and the acquisition consent ID is different compared to the blocks 308 and 309.

The block 312 is a handling execution record expressing the usage of data by "dealer1". The type of record is "handling execution", and the type of handling is "usage". The related party of the data is the BC user ID "hanako" of the consent ID=00 that is referenced. Although "dealer1" corresponds to the data-handling party (see FIG. 1), the usage of data can be carried out by not only the data-using party but also the data-handling party. In other words, the data-handling party may also be the data-using party.

The block 313 indicates a record (handling consent record) in which the data-related party with the BC user ID "hanako" has rescinded consent to the acquisition of data by the data-handling party "dealer1". In the block 313, the status is "non-consent".

The blocks 314 and 315 each indicate the same handling consent record as the block 313, except that the BC user ID is different. The BC user IDs indicated in the blocks 314 and 315 have been changed according to the using party, or in other words, are identifiers that uniquely correspond to the using party. In the blocks 314 and 315, the type of record is "handling consent re-", and the status is "non-consent".

The block 316 indicates a record (handling consent record) in which the data-related party with the BC user ID "hanako" has rescinded consent to handling involving the disclosure of data from "dealer1" to "company1".

The block 317 indicates the same handling consent record as the block 316, except that the BC user ID is different. The BC user ID indicated in the block 317 has been changed according to the using party, and is an identifier that uniquely corresponds to the using party. In the block 317, the type of record is "handling consent re-", and the status is "non-consent".

The block 318 is a handling execution record expressing the deletion of data by "dealer1". The related party of the data is "hanako", which is indicated by the BC user ID in the block 313 of the consent ID (transaction ID)=13 that is referenced.

Note that various information may be included in a record written to the blockchain. For example, a handling consent record related to acquisition (block 300, for instance) may include from where the handling party will acquire the data, or in other words, the source of the data. Also, a handling execution record related to acquisition (block 307, for instance) may include from where the handling party acquired the data, or in other words, the source of the data. As another example, in some cases, a handling consent record related to disclosure (for instance, block 308) may include an indication that all of the data may be provided, or include information such as data categories indicating which portions of the data may be provided. Also, in these handling consent records and handling execution records, the recipient of the data may be included explicitly, or the recipient of the data may be omitted if the recipient of the data can be ascertained by referencing another record as described above.

Also, in the example of FIGS. 2 and 3, a single record is written to a single block, but records and blocks do not necessarily need to exist in a one-to-one relationship, and a plurality of records may also be written to a single block. For example, a handling consent record related to acquisition and a handling consent record related to disclosure may be written to a single block. Also, a plurality of categories of the same type may be described inside a single record. For example, a plurality of consents, such as consent to acquisition and consent to disclosure, may be included in a single handling consent record. Alternatively, consent related to acquisition for each of a plurality of related parties may be included in a single handling consent record related to acquisition. Also, in the case where a plurality of data is provided at once on the basis of a plurality of consents, information indicated by a plurality of handling consent records related to data disclosure may be included in a handling execution record related to data disclosure.

A record may also be written to a block in any way, insofar as necessary information can be read from the block. For example, all or part of a record may also be included in a block as metadata.

By writing records to a blockchain in this way, traceability can be secured. Note that because the blocks in the blockchain are usable by the information processing apparatuses belonging to the blockchain system (P2P network), anonymity is a problem, but anonymity measures are also implemented in the blockchain of FIGS. 2 and 3. For example, in FIGS. 2 and 3, the BC user ID is indicated by the identifier (pseudonym) "hanako", but if the identifier is unrelated to the actual name of an individual, identifying the individual is difficult. By implementing a technique of pseudonymization in which a personal name is replaced by another character string, number, or the like on the basis of a predetermined rule, identifying individuals can be made more difficult.

Note that various information may be added to a record written to the blockchain. For example, details about the data to be acquired, provided, or the like may be added. In the case where the handling party apparatus 102 provides a portion of data handed over from the related party apparatus 101 to the using party apparatus 103, information enabling the portion to be recognized, such as one or more category names or positions inside the data for example, may also be recorded. Additionally, in the case where there is a single handling party apparatus 102, the BC user ID of the handling party apparatus 102 acting as the provider does not have to be included in a record.

Figure 4:
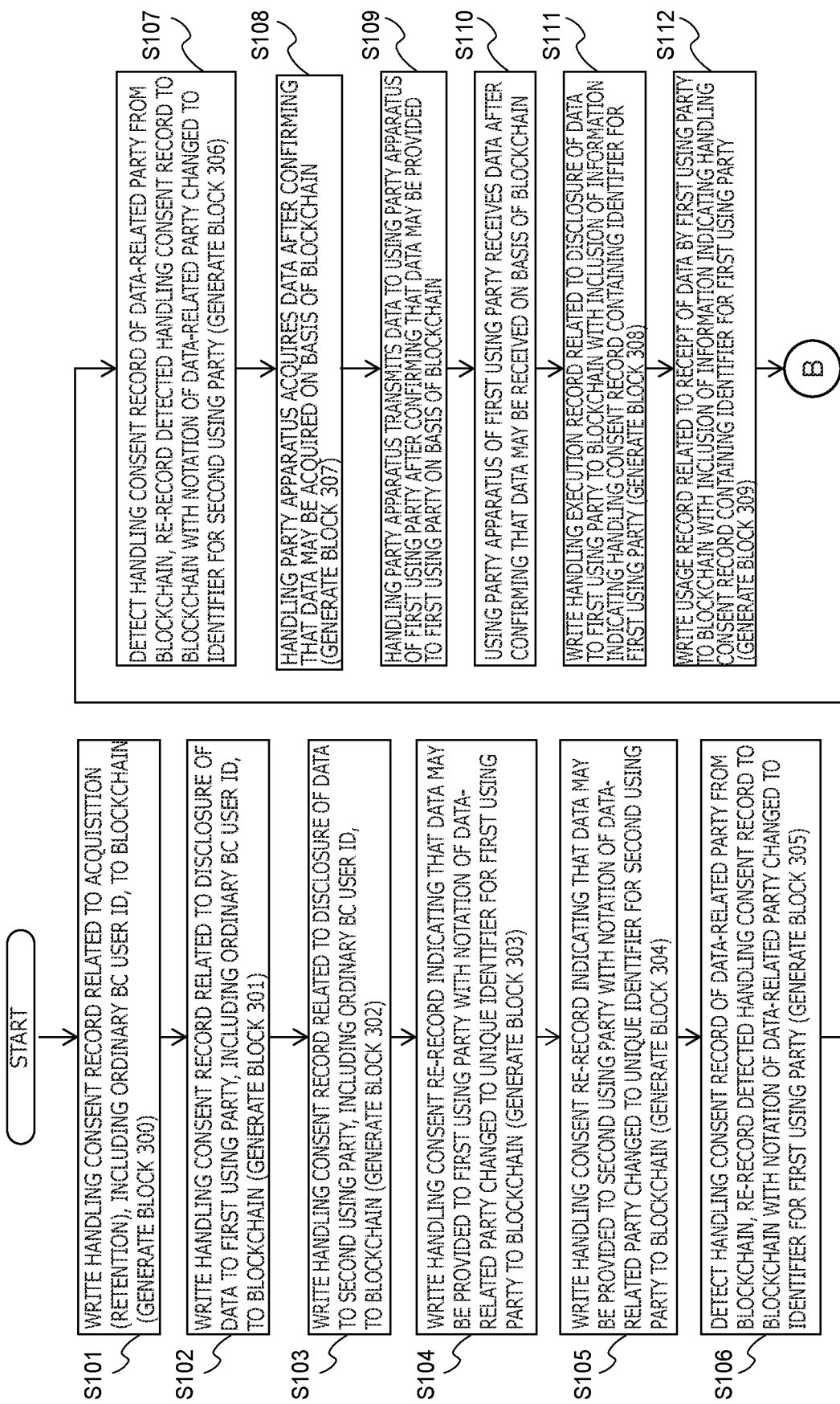
FIG. 4 is a schematic flowchart of an overall process according to the present embodiment.
Figure 5:
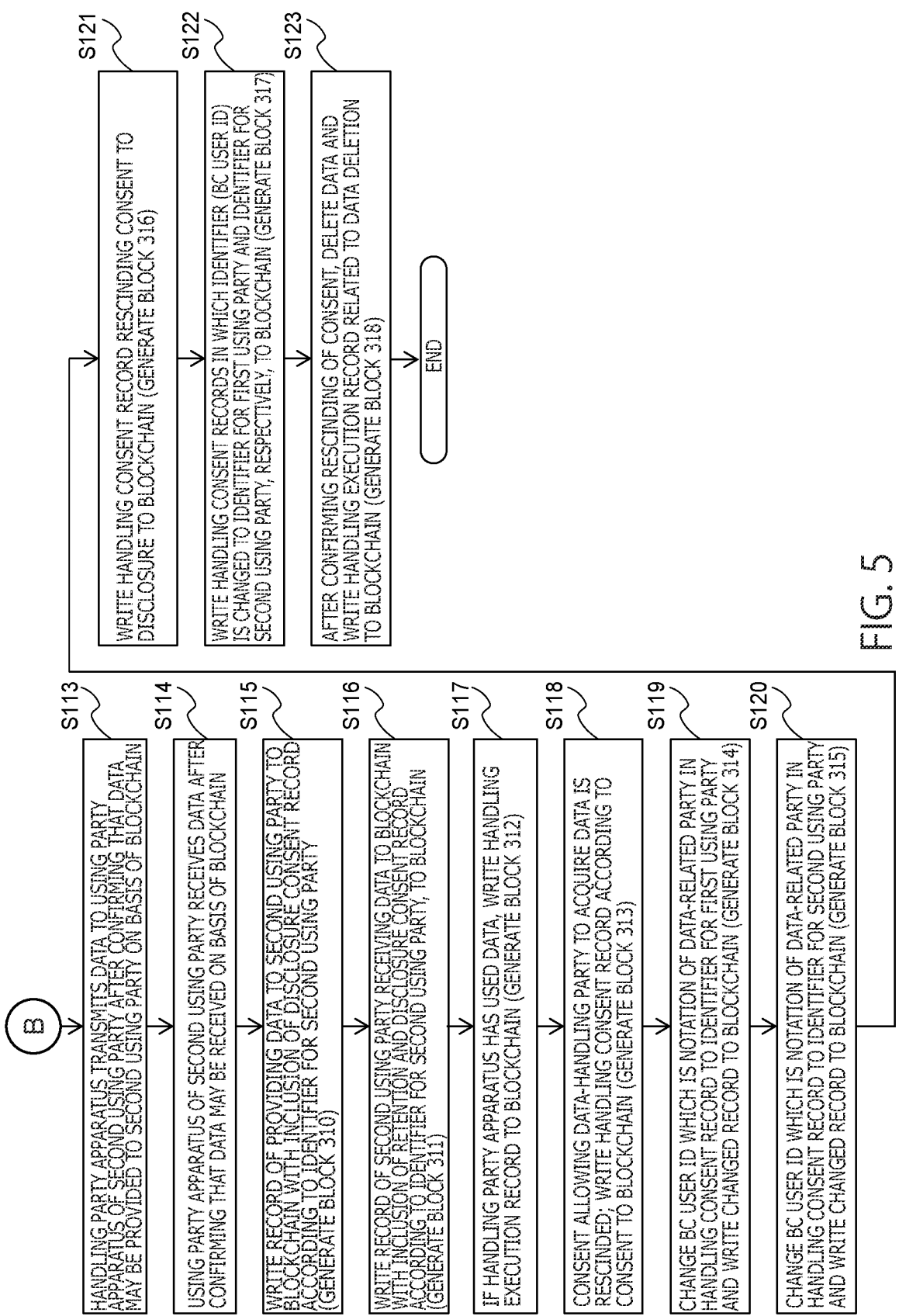
FIG. 5 is a continuation of the flowchart in FIG. 4.

Hereinafter, a process for generating the blockchain illustrated in FIGS. 2 and 3 will be described. FIG. 4 is a schematic flowchart of an overall process according to the present embodiment. FIG. 5 is a continuation of the flowchart in FIG. 4.

It is assumed that the acting party that writes to the blockchain may change. As an example, consent records are written by the data-related party, whereas handling records and usage records are written by the apparatus (handling party apparatus, using party apparatus) of the acting party that handles or uses data. However, it is also possible to request another apparatus to write a record, and the requested apparatus may write the record. In the following description, the record to be written may be described as the grammatical subject and the acting party that writes the record may be omitted in some cases, but as described above, records may be written by any apparatus.

Also, the flow of data to be handled may be performed prior to the writing of a record to the blockchain, but the flow of data and the writing to the blockchain may also be performed in reverse order or at the same time. For example, data may be received after a handling consent record related to acquisition is written, or a handling consent record for acquisition may be written after data is received together with the acquisition consent. Also, in the case of handling a plurality of data in parallel, the present flow is processed in multiple, parallel instances. Hereinafter, the flow will be described in detail.

Consent allowing the data-handling party (in the example of FIG. 3, "dealer1") to acquire data is established between the data-related party and the data-handling party, and a handling consent record regarding the consent is written to the blockchain (S101). With this arrangement, the block 300 in FIG. 2 is generated. Note that the execution of process in step S101 may be triggered when the handling party apparatus 102 receives data of the data-related party, or the handling consent record only may be generated and written to the blockchain prior to the receipt of such data. Here, the latter case is assumed.

Furthermore, consent allowing the data to be provided to a first using party is established by the data-related party, and a handling consent record indicating that the data may be provided to the first using party (in the example of FIG. 3, "company1") is written to the blockchain (S102). In this record, an ordinary identifier (in the example of FIG. 3, the pseudonym "hanako") is used as the BC user ID of the data-related party. Also, consent allowing the data to be provided to a second using party (in the example of FIG. 3, "company2") is established by the data-related party, and a handling consent record indicating that the data may be provided to the second using party is written to the blockchain (S103). In this record, too, the ordinary identifier (pseudonym) is used as the BC user ID of the data-related party. Through the processes in steps S102 and S103, the blocks 301 and 302 in FIG. 2 are generated.

Furthermore, the identifier ("hanako") of the data-related party in the handling consent record of the block 301 is changed to a unique identifier (in the example of FIG. 3, "g7h8i9") for the first using party, and the changed handling consent record is rewritten to the blockchain (S104). The handling consent record that is rewritten will be referred to as a handling consent re-record to distinguish from the handling consent record written using the ordinary BC user ID ("hanako"), and the type of record is designated "handling consent re-". Also, the identifier ("hanako") of the data-related party in the handling consent record of the block 302 is changed to a unique identifier (in the example of FIG. 3, "j1k2m3") for the second using party, and the changed handling consent record is rewritten to the blockchain (S105). Through the processes in steps S104 and S105, the blocks 303 and 304 in FIG. 2 are generated.

The disclosure of data enables use of the data by a data-using party. In the case of a handling consent record related to data handling such as data disclosure that, if executed, allows a using party to use data, the identifier of the data-related party in the handling consent record is changed to an identifier uniquely corresponding to the using party and the changed handling consent record is rewritten, as in the above steps S104 and S105.

Note that the identifier uniquely corresponding to the using party may be determined appropriately. An identifier uniquely corresponding to the using party may be acquired by converting all or part of the ordinary BC user ID according to a predetermined rule, or a unique identifier may be newly assigned to the using party. For example, the ordinary BC user ID may be converted on the basis of an individual key possessed by each third party (using party). Also, an identifier uniquely corresponding to the using party may be acquired by converting the ordinary BC user ID on the basis of a combination of an individual key possessed by each third party and an individual key possessed by the data-related party. The ordinary BC user ID may also be encrypted.

Next, the records for the data-related party expressed by the identifier for each using party are made to be traceable with the identifier. For example, if it is unknown (with only the information in blocks 300 to 304) that "g7h8i9" corresponds to "hanako", it cannot be recognized whether the data-related party "hanako" corresponding to "g7h8i9" has given consent to the data-handling party regarding the acquisition of data, Consequently, an information processing apparatus such as the handling party apparatus 102 that recognizes the correspondence relationship between the identifiers before and after the change detects, from the blockchain, the handling consent record in which the data-related party is expressed by a BC user ID of an ordinary identifier (in the example of FIG. 3, "hanako"). The handling party apparatus 102 changes the identifier "hanako" of the data-related party in the detected handling consent record to an identifier (in the example of FIG. 3, "g7h8i9") for the first using party, and re-records the changed handling consent record to the blockchain (S106). With this arrangement, the block 305 indicating the handling consent re-record for the handling consent record of the block 300 is generated. With the block 305, even a using party that only knows the BC user ID "g7h8i9" can recognize that the data-related party corresponding to "g7h8i9" has consented to data acquisition by the data-handling party.

Similarly, the detected handling consent record is re-recorded to the blockchain with the identifier of the data-related party changed to an identifier (in the example of FIG. 3, "j1k2m3") for the second using party (S107). With this arrangement, the block 306 indicating the handling consent re-record for the handling consent record of the block 300 is generated.

Suppose that the handling party apparatus 102 attempts to acquire data. In this case, the handling party apparatus 102 first confirms that the data may be acquired on the basis of the blockchain (block 300), and then acquires the data (S108). The block 307 indicating the handling execution record related to data acquisition is generated with the inclusion of information (consent ID=00) indicating the handling consent record. The source of the data may be the related party apparatus 101 or another information processing apparatus.

Thereafter, suppose that the handling party apparatus 102 attempts to provide data to the first using party. In this case, the handling party apparatus 102 first confirms that the data may be provided to the first using party on the basis of the blockchain (block 301 or 303), and then transmits the data to the using party apparatus 103 of the first using party (S109). On the other hand, the using party apparatus 103 of the first using party that receives the provided data first confirms that the data is receivable on the basis of the blockchain (blocks 303 and 305) before receiving the data (S110).

Whether or not the data is providable and receivable may be checked using the BC user ID corresponding to the recipient using party apparatus 103. In the example of FIG. 3, in the case of attempting to provide data about "hanako" to "company1", the BC user ID "g7h8i9" of "hanako" for "company?" is used as a search key to detect handling consent records. With this arrangement, the blocks 303 and 305 in which "g7h8i9" is written in the handling consent record are detected, and it is determined that consent related to disclosure and acquisition has been established. Note that the confirmation that the data may be provided to the first using party and the confirmation that the first using party may receive the data may also include a confirmation that the data-handling party may acquire the data from the data-related party (block 305).

Note that the handling party apparatus 102 and the using party apparatus 103 may reference the blockchain directly to check whether the data is providable and receivable. Alternatively, the handling party apparatus 102 and the using party apparatus 103 may request another information processing apparatus belonging to the blockchain system 104 to determine whether the data is providable and receivable. Note that causing a large number of information processing apparatuses belonging to the blockchain system 104 to determine whether the data is providable and receivable has the merit of ensuring transparency in the determination.

Thereafter, a handling execution record related to the disclosure of data to the first using party by the data-handling party is written to the blockchain with the inclusion of information identifying the handling consent record that contains the identifier for the first using party (S111). With this arrangement, the block 308 in FIG. 2 is generated. Also, a usage record related to the receipt of data by the first using party is written to the blockchain with the inclusion of information identifying the handling consent record that contains the identifier for the first using party (S112). With this arrangement, the block 309 in FIG. 2 is generated.

In the above handling execution record (block 308) and usage record (block 309), identifiers (such as ordinary identifiers) other than the identifier for the first using party are removed. This prevents a third party from collating data to thereby identify which related party the data belongs to. The block 308 includes the transaction ID 03 of the handling consent record related to disclosure containing the identifier "g7h8i9" for the first using party as the consent ID. On the other hand, the block 309 includes the transaction IDs 03 and 05 of the handling consent records related to disclosure and acquisition containing the identifier "g7h8i9" for the first using party.

In the case where the handling party apparatus 102 attempts to provide data to the second using party, a process similar to the case of attempting to provide data to the first using party is performed.

More specifically, as illustrated in FIG. 5, the handling party apparatus 102 first confirms that the data may be provided to the second using party on the basis of the blockchain (block 302 or 304), and then transmits the data to the using party apparatus 103 of the second using party (S113). On the other hand, the using party apparatus 103 of the second using party that receives the provided data first confirms that the data is receivable on the basis of the blockchain (blocks 304 and 306) before receiving the data (S114). Additionally, a handling execution record related to the disclosure of data to the second using party is written to the blockchain with the inclusion of information indicating the handling consent record that contains the identifier for the second using party (S115). With this arrangement, the block 310 is generated. Also, a usage record related to the receipt of data by the second using party is written to the blockchain with the inclusion of information indicating the handling consent record that contains the identifier for the second using party (S116). With this arrangement, the block 311 is generated.

The IDs indicating the handling consent records included in the blocks 310 and 311 all indicate the handling consent records related to the identifier "j1k2m3" for the second using party. With this arrangement, the blocks 308 and 310 are both handling execution records related to disclosure, but because the recipient using parties are different, the disclosure consent IDs included in each are different. Also, the blocks 309 and 311 are both usage records related to receipt, but because the receiving using parties are different, the disclosure consent IDs and the acquisition consent IDs included in each are different.

The handling party apparatus 102 uses the data. For example, a handling execution record is generated by the handling party apparatus 102 and written to the blockchain. With this arrangement, the block 312 is generated (S117).

The consent allowing the data-handling party (in the example of FIG. 3, "dealer1") to acquire data is rescinded by the data-related party, and a handling consent record related to the consent is written to the blockchain by, for example, the related party apparatus 101 (S118). With this arrangement, the block 313 is generated.

Next, consent is also made to be traceable using the identifier for each using party. An information processing apparatus such as the handling party apparatus 102 that recognizes the correspondence relationship between the identifiers before and after the change changes the identifier (ordinary identifier) of the data-related party to an identifier for the first using party in the handling consent record (block 313), and thereby generates a handling consent re-record.

The generated handling consent re-record is written to the blockchain (S119). In the example of FIG. 3, a record (handling consent re-record) is generated in which "hanako" in block 313 is changed to the identifier "g7h8i9" for the first using party. With this arrangement, the block 314 is generated. With the block 314, even a using party that only knows the BC user ID "g7h8i9" can recognize that the data-related party corresponding to "g7h8i9" has rescinded consent.

Similarly, the handling party apparatus 102, for example, changes the identifier (ordinary identifier) of the data-related party in the handling consent record (block 313) to the identifier (in the example of FIG. 3, "j1k2m3") for the second using party, and thereby generates a handling consent re-record (S120). The generated handling consent re-record is written to the blockchain (also S120). With this arrangement, the block 315 indicating the handling consent re-record for the handling consent record of the block 313 is generated.

When consent to acquisition is rescinded, if information about the rescinding of the corresponding consent to disclosure has not been written to the blockchain, a handling consent record rescinding the consent to disclosure is written to the blockchain by, for example, the related party apparatus 101 or the handling party apparatus 102 (S121). With this arrangement, the block 316 is generated.

Like the case of rescinding consent to acquisition, a handling consent re-record in which the ordinary identifier of the block 316 is changed to the identifier for the first using party is generated by, for example, the handling party apparatus 102 (S122). Each handling consent re-record is written to the blockchain (also S122). With this arrangement, the block 317 is generated.

The handling party apparatus 102, after confirming the rescinding of consent (consent to acquisition) by the data-related party on the basis of the block 313, deletes the retained data (S123). The handling party apparatus 102 generates a handling execution record related to data deletion, and information (consent ID=13) indicating the handling consent record is included in the generated handling execution record (also S123). The generated handling execution record is written to the blockchain (also S123). With this arrangement, the block 318 is generated.

If records are written to the blockchain in this way, a history of consent with respect to disclosure to third parties and the disclosure can be checked while also reducing the disadvantages that may occur in the event of a data leak, such as the further leaking of information that could be used to identify the data-related party through data collation.

For example, by using a BC user ID of an ordinary identifier as a search key to read out the handling consent records written to blocks on the blockchain, the data-related party can confirm whether or not the handling conforms to the content of the consent intended by the data-related party. In the example of FIG. 3, the related party apparatus 101 can uses "hanako" as a search key to detect the blocks 300, 301, 302, and 313. Accordingly, it is possible to confirm whether or not the consent to acquisition (consent to retention), the consent to disclosure with respect to the first using party referred to as "company1", and the consent to disclosure with respect to the second using party referred to as "company2" are valid.

Also, at the time of step S112, the using party apparatus 103 of the first using party can use the identifier "g7h8i9" for the first using party as a search key to detect the blocks 303 and 305. Accordingly, it is possible to confirm that consent to disclose the received data has been established and that the circumstances of acquisition is dear. Likewise, at the time of step S115, the using party apparatus 103 of the second using party can use the identifier "j1k2m3" for the second using party as a search key to detect the blocks 304 and 306, and make a similar confirmation.

In this way, by generating a blockchain according to the processes illustrated in FIGS. 4 and 5, traceability is secured.

Additionally, the first using party cannot recognize that the identifier "j1k2m3" for the second using party represents the same data-related party as the identifier "g7h8i9" for the first using party. Likewise, the second using party cannot recognize that the identifier "g7h8i9" for the first using party represents the same data-related party as the identifier "j1k2m3" for the second using party. For this reason, even if one of either the first using party or the second using party leaks data, the other party would be unable to identify the data as being data related to "hanako" through collation. Consequently, the disadvantages from a data leak can be reduced.

Note that the data-related party knows the identifier for each data-using party, and the generation of the block 301, the block 302, and the like may also be skipped depending on the specifications of the system, such as in the case where traceability can be secured with the identifier for each data-using party. Also, in the case of skipping the generation of the block 301, the block 302, and the like, an information processing apparatus that recognizes the correspondence relationship between the ordinary identifier and the unique identifier for each using party may be queried. This arrangement makes it possible to confirm the ordinary identifier of the data-related party or the identifier for the data-using party for which consent has been given in relation to data disclosure, data acquisition, or the like.

Note that the related party apparatus 101 may also rescind consent to disclosure after having consented to data disclosure. For this reason, when providing data, the ability to confirm that consent to disclosure has not been rescinded is preferable. Namely, in the case where the related party apparatus 101 rescinds consent to the disclosure of data, a record of rescinding the consent to disclosure is written to the blockchain. When providing data, the handling party apparatus 102 preferably searches the blockchain using the BC user ID of the related party apparatus 101 as a search key to determine whether the consent to disclosure has been rescinded. Note that in the case where a validity period is indicated by a consent to disclosure, it is preferable to confirm that the validity period indicated by the consent to disclosure has not expired. In this way, when providing data, it is preferable to confirm the validity of the consent to disclosure.

Note that although only "dealer1" is described as a data-handling party in the above, a plurality of handling parties may also exist in some cases. In such cases, the BC user ID of the data-related party may be changed for each of the plurality of data-handling parties. Also, the BC user ID of the data-related party may be changed for each combination of a data-handling party and a data-using party. For example, "g7h8i9" is used in a handling consent record for data disclosure from the data-handling party "dealer1" to the data-using party "company1". On the other hand, an identifier different from "g7h8i9" is used in a handling consent record for data disclosure from a different data-handling party referred to as "dealer2" to the data-using party "company1". With this arrangement, the disadvantages from a data leak can be reduced.

Note that the blockchain in FIGS. 2 and 3 is an example, and a variety of records may be written to the blockchain. For example, usage records other than the receipt of data, such as a record of a data-using party executing data analysis, editing, erasure, or the like, may also be written. Additionally, a usage record related to receipt may also include information such as a category of the received data and the BC user ID of the handling party apparatus 102 that provided the data.

Figure 6:
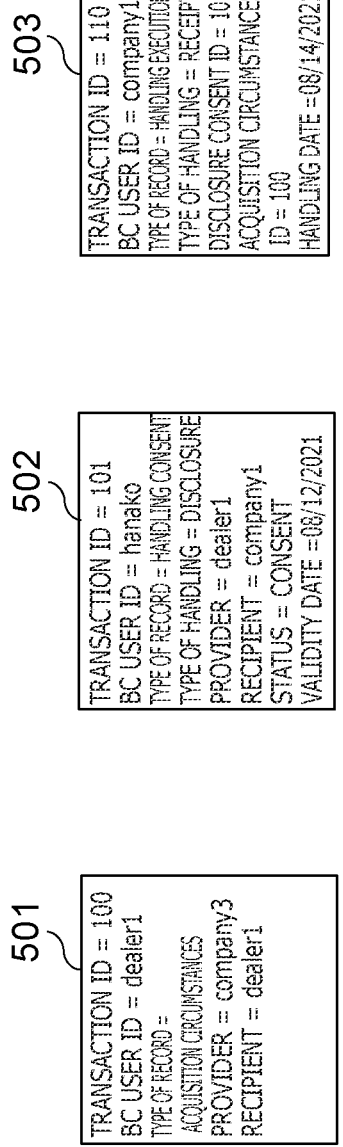
FIG. 6 is a diagram for explaining an example of other records.

FIG. 6 is a diagram for explaining another example of records. FIG. 6 illustrates an example of blocks for three records, all of which have been extracted for description from records written to a blockchain.

A block 501 contains a provider of data and a recipient of data (the acting party that has acquired the data) as a circumstances of data acquisition. The statement "provider=company3" means that the party that actually transmitted the data to "dealer1" is "company3" rather than the data-related party "hanako". As described above, the data may also be received from a different information processing apparatus such as the apparatus of a data-managing party rather than from the related party apparatus 101. In such cases, the data provider (in this example, "company3") may be included in the record and a record of the acquisition circumstances may be generated, as in the block 501.

In a block 502, the provider is "dealer1" and the recipient is "company1". The circumstances of acquisition by the provider "dealer1" is indicated by the acquisition circumstances record of the block 501 with the acquisition circumstances ID=100.

A block 503 indicates a handling execution record indicating that the handling party apparatus "BC user ID=company1" has received data. In the block 503, "acquisition circumstances ID=100" is indicated as the basis of the data receipt. The acquisition circumstances is the circumstances of data acquisition by the provider of data. The statement "disclosure consent ID=101" indicated in the block 503 indicates the handling consent record of the block 502.

A record of the acquisition circumstances may be generated one at a time for each data-related party. In the case where the circumstances of acquisition is the same for all data-related parties, a single record of the common acquisition circumstances for all data-related parties may be generated. The block 501 is an example in which a single record of the common acquisition circumstances for all data-related parties is generated. In the case of generating a record of the acquisition circumstances for each data-related party, the BC user ID of the data-related party may be included in the record of the acquisition circumstances.

Hereinafter, the verification apparatus 105 that verifies the consistency of records written to the blockchain ill be described.

The verification of consistency is based on the following rules 1 to 8 regarding handling consent records, handling execution records, and handling execution by the handling party and the using party. In other words, the verification of consistency involves verifying whether or not rules 1 to 8 are obeyed on the basis of the records written to the blockchain. If the following rules 1 to 8 are upheld when records are written in accordance with the blockchain of FIGS. 2 and 3 described above and when handling (such as acquisition, receipt, usage, and deletion) is executed by the handling party and the using party, an inconsistency is not detected by the verification of consistency. Rules 1 to 8 are merely an example, and rules other than rules 1 to 8 may also exist. Moreover, not all of rules 1 to 8 are necessary, and there may be at least one rule only. The content of each rule may also be changed. Moreover, a portion of the content included in each rule may also be removed.

[Rule 1]

The types of handling of handling consent records are taken to be "acquisition (retention)" and "disclosure". In the present embodiment, acquisition is defined to also include retention, but it is also possible to distinguish between acquisition and retention. In this case, the types of handling may be acquisition, retention, and disclosure.

Consent to the acquisition of data includes consent to the use of the data by the handling party in addition to the acquisition of the data by the handling party. A handling consent record of acquisition includes fields for the transaction ID, the BC user ID, the type of record, the type of handling, the handling party, the status, and the validity date. A handling consent record of acquisition means consent to the handling party acquiring data from the related party indicated by the BC user ID.

Consent to the disclosure of data includes consent to the use of the data by the recipient in addition to the disclosure of the data to the recipient by the provider. A handling consent record of disclosure includes fields for the transaction ID, the BC user ID, the type of record, the type of handling, the provider, the recipient, the status, and the validity date.

Consent is valid from the time 00:00 on the validity date. The days that can be designated as the validity date are taken to be the days that come after the date and time of the consent record.

[Rule 2]

The types of handling of handling consent re-records are taken to be "acquisition" and "disclosure". The content of a handling consent re-record is taken to be identical to the handling consent record from which the handling consent re-record is generated (the handling consent record that corresponds to the handling consent re-record), except for the transaction ID and the BC user ID.

[Rule 3]

The types of handling of handling execution records are taken to be "acquisition", "usage", "disclosure", "receipt", and "deletion".

The handling execution records of each of the acquisition, usage, disclosure, and deletion of data include fields for the transaction ID, the BC user ID, the type of record, the type of handling, the consent ID, and the handling date.

A handling execution record of the receipt of data includes fields for the transaction ID, the BC user ID, the type of record, the type of handling, the disclosure consent ID, the acquisition consent ID, and the handling date.

The acquisition of data is executed on the basis of a handling consent record of acquisition.

The usage of data is executed on the basis of a handling consent record of acquisition. The handling party in a handling consent record of acquisition can use data. Alternatively, the usage of data is executed on the basis of a handling consent record/handling consent re-record of disclosure. The recipient in a handling consent record/re-record of disclosure can use data.

The disclosure of data and the receipt of data are executed on the basis of a handling consent re-record of disclosure.

The deletion of data is executed on the basis of a handling consent record of acquisition in which the handling party that acquired the data to be deleted is described in the handling party field and the status is non-consent. Alternatively, the deletion of data is executed on the basis of a handling consent re-record of disclosure in which the handling party apparatus that was provided with the data to be deleted is described in the recipient field and the status is non-consent.

[Rule 4]

When a handling consent record of acquisition with a status of non-consent is written, if the handling consent record of disclosure of the relevant data contained a status of consent, a handling consent record of disclosure with the status set to non-consent is generated. Also, when a handling consent record of acquisition with a status of non-consent is written, if a handling consent re-record of disclosure of the relevant data exists and contains a status of consent, a handling consent re-record with the status set to non-consent is generated with respect to the identifier for the using party used in the handling consent re-record of disclosure. At this time, if identifiers for a plurality of using parties are used in the handling consent re-record, the identifiers for all of the using parties may be processed as above.

[Rule 5]

The deletion of data is executed in a non-consent period immediately after the validity date of a handling consent record of acquisition for which the status is non-consent. Alternatively, the deletion of data is executed if the recipient is a handling party apparatus in a non-consent period immediately after the validity date of a handling consent record of disclosure for which the status is non-consent.

[Rule 6]

Handling (acquisition, usage, disclosure, receipt) that presupposes multiple types of consent is performed in a period during which all of the consent periods overlap. The usage or disclosure of data requires consent to the handling party using or providing the data in addition to consent to the handling party acquiring or accepting the disclosure of the data,

[Rule 7]

Usage, disclosure, and deletion cannot be executed with respect to data that has not been acquired and received.

[Rule 8]

The handling date of a handling execution record of the disclosure of data is the same as the handling date of a handling execution record of the receipt of the data.

The following illustrates examples of modifications to rules 1 to 8 or examples of other rules.

After consent is rescinded, data may be put into a suspended state without being deleted.

In the case where the handling party apparatus 102 and the using party apparatus 103 do not use a shared blockchain system, it is also acceptable to verify only one of either records of disclosure or records of receipt.

In rules 1 to 8, consent periods are set in units of days, but other units such as hours, weeks, or months may also be used.

Consent may be considered valid from the time point at which a handling consent record is written to the blockchain. In this case, the handling consent record may contain a recording date and time that also serves as the validity start date and time.

The period of validity may be determined by a sequence of blocks indicating handling consent records. That is, the period of validity may be considered to he the period from when a block indicating a record of consent is written until a block indicating a record of the rescinding of the consent is written. In this case, the recording date and time and the validity date and time do not have to be recorded in a record of consent.

When an acquisition consent is rescinded, a record of the rescinding of disclosure consent does not have to be generated and written.

In the case of rescinding a disclosure consent, if the recipient is a using party apparatus, the data received by the using party apparatus may be deleted.

Figure 7:
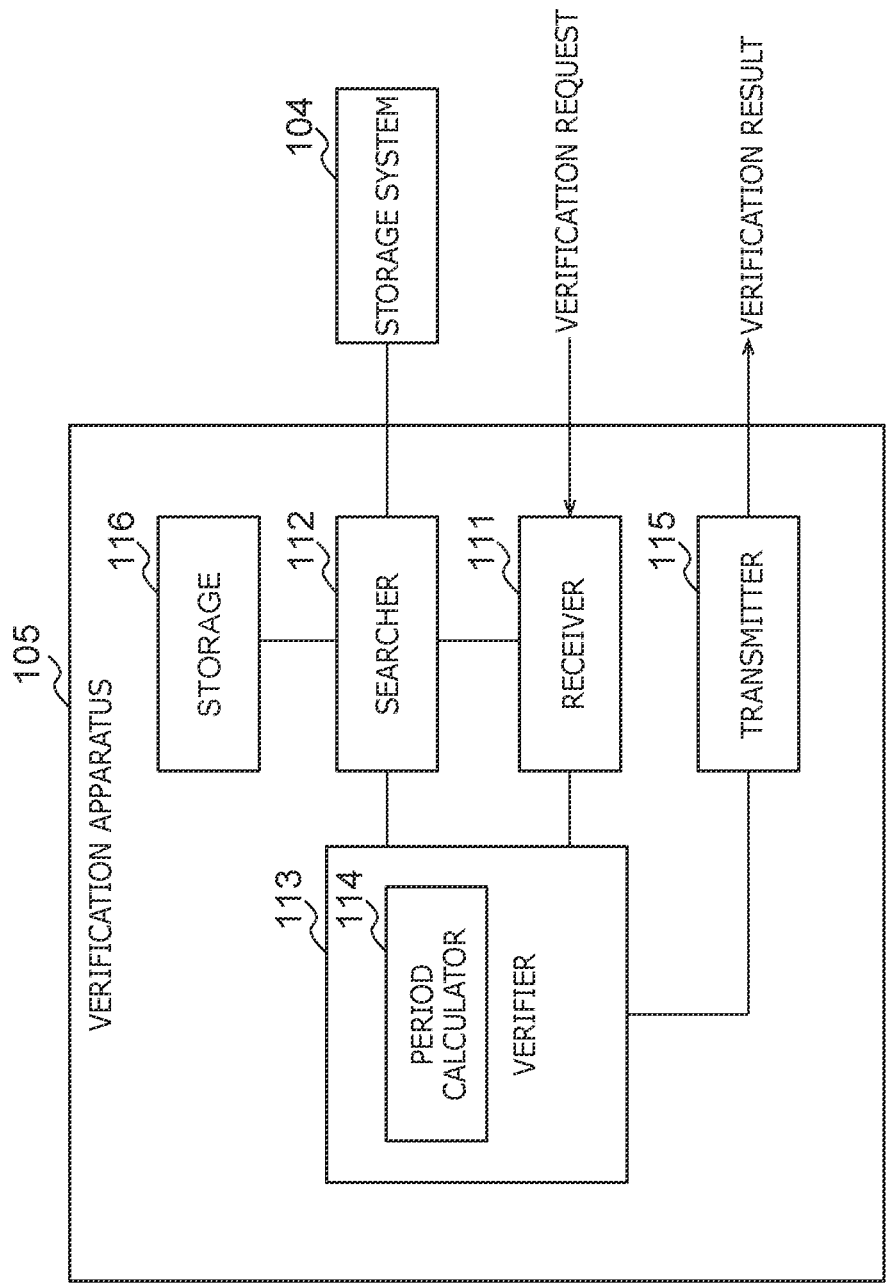
FIG. 7 is a block diagram of a verification apparatus according to an embodiment of the present invention.

Hereinafter, FIG. 7 will be used to describe the verification apparatus 105 in detail. FIG. 7 is a block diagram of the verification apparatus 105. The verification apparatus 105 is provided with a receiver 111, a searcher 112, a verifier 113, a transmitter 115, and storage 116. The verifier 113 includes a period calculator 114.

The receiver 111 receives, from a requester apparatus, a request to verify the consistency (consistency verification request) with respect to records (handling consent records or handling execution records) related to the handling of data. The requester apparatus may be any apparatus, such as the related party apparatus 101, a management apparatus that manages the data of related parties, an apparatus operated by an organization that audits handling parties, the using party apparatus 103, or an apparatus operated by an organization that audits using parties, but is not limited to a specific apparatus. The storage 116 stores identifier correspondence information, which is information including a correspondence between a BC user ID serving as an identifier for a using party and a BC user ID serving as an ordinary identifier (pseudonym or real name). In the case where the verification apparatus 105 is an apparatus other than a handling party apparatus (for example, the using party apparatus 103), the identifier correspondence information does not have to be stored in the storage 116. Otherwise, in the case where the verification apparatus 105 is the using party apparatus 103, the identifier correspondence information may include only a correspondence between an identifier for a using party and an ordinary identifier corresponding to the using party apparatus 103.

The searcher 112 searches a storage system 104 (in this example, a blockchain) on the basis of a condition included in the verification request, and acquires handling consent records and handling execution records that are related to each other. In other words, the searcher 112 transmits a search request to the storage system 104 and receives, as a response from the storage system 104, the handling consent records and handling execution records that are related to each other and that satisfy the condition. At this time, if it is necessary to specify an ordinary identifier from an identifier for a using party, the searcher 112 uses the identifier correspondence information in the storage 116. The handling consent records or the handling execution records are retrieved on the basis of the condition designated by the verification request. As an example, the condition designates the value of a field included in the handling consent records or handling execution records.

The period calculator 114 calculates at least one of a consent period or a non-consent period of the related party that is related to the handling of data, on the basis of the acquired handling consent records.

The verifier 113 verifies the consistency on the basis of at least one of the consent period or the non-consent period and the acquired handling execution records.

The transmitter 115 transmits information indicating a verification result regarding consistency to the requester apparatus of the verification.

Hereinafter, a specific example will be used to describe operations by the verification apparatus 105 in detail.

VERIFICATION EXAMPLE 1: VERIFICATION BY ORDINARY (REAL NAME OR PSEUDONYM) BC USER ID, STARTING FROM HANDLING EXECUTION RECORD OF RECEIPT

Figure 8:
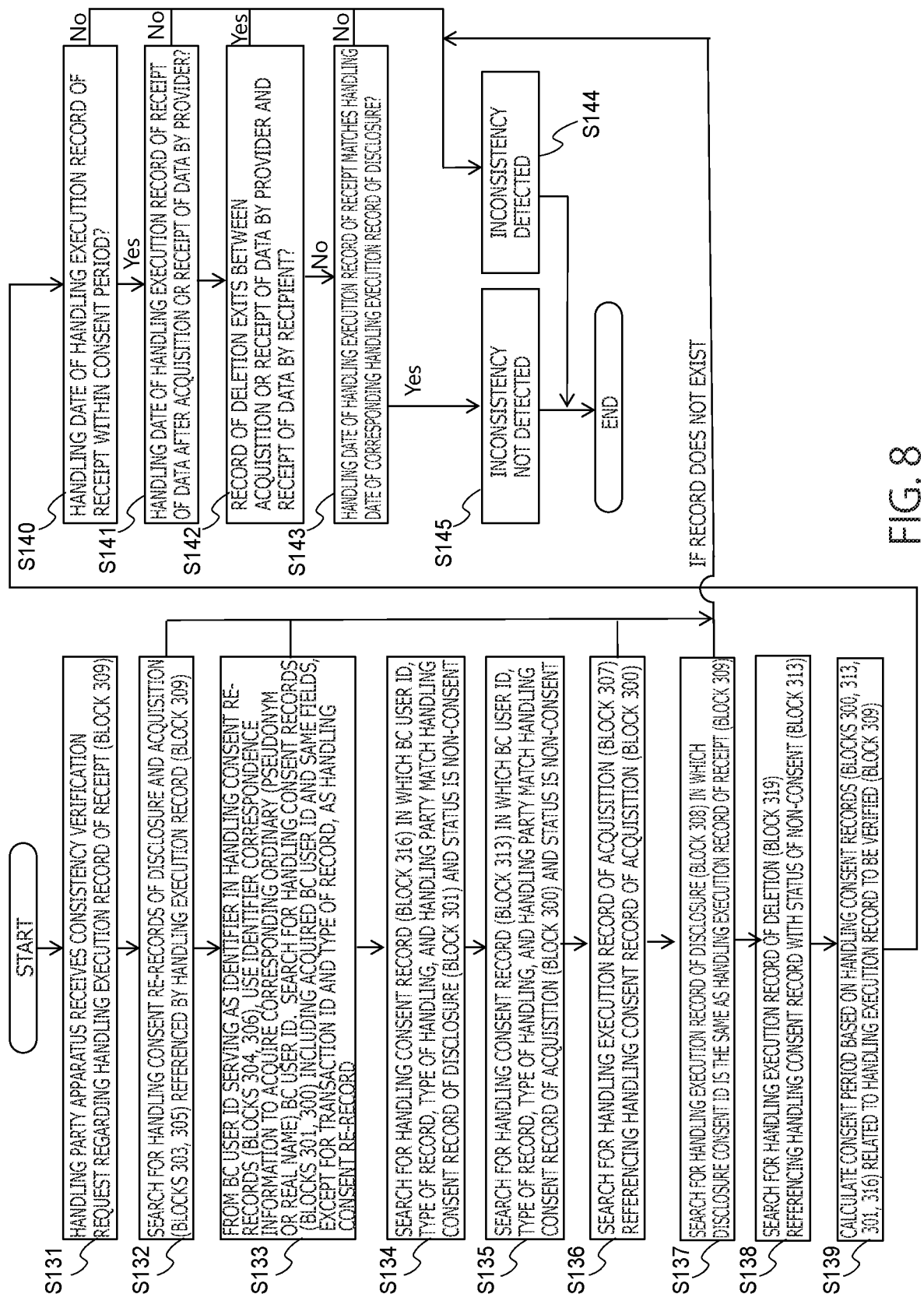
FIG. 8 is a flowchart of one example of operations in Verification Example 1.
Figure 9:
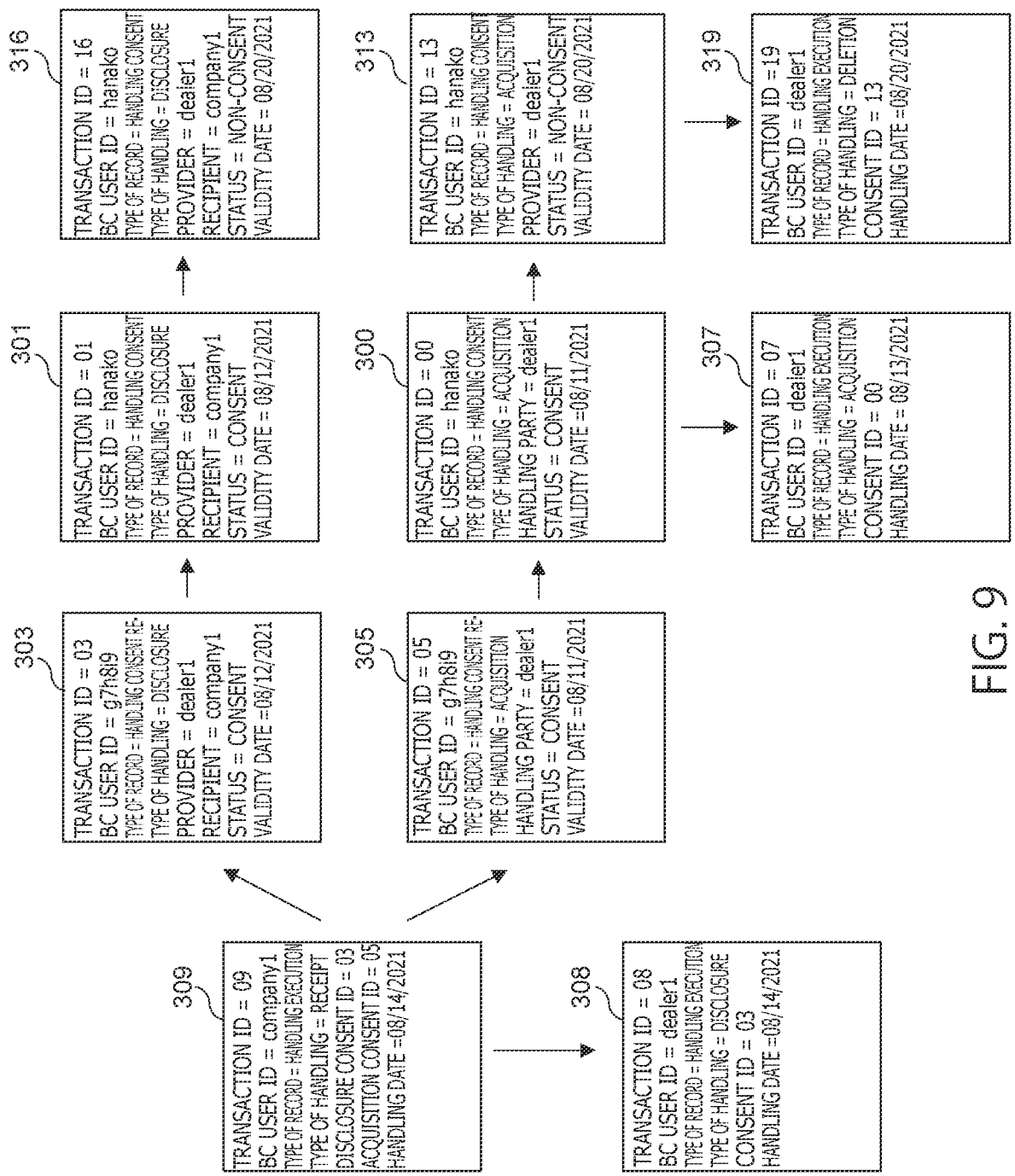
FIG. 9 is a diagram illustrating how blockchain records are traced in the operations of FIG. 8.

This example assumes that the verification apparatus 105 is the handling party apparatus 102, but the verification apparatus 105 may also be any of the related party apparatus, the handling party apparatus, or the using party apparatus, or some other information processing apparatus. FIG. 8 is a flowchart of one example of operations in Verification Example 1, FIG. 9 is a diagram illustrating how blockchain records are traced in the operations of FIG. 8.

(Step S131)

The receiver 111 receives a consistency verification request regarding the handling execution record of receipt indicated in the block 309 of FIG. 2, <Acquire Related Handling Consent Records and Handling Execution Records>

(Step S132)

The searcher 112 searches for handling consent re-records related to the handling execution record of the block 309 to be verified. The transaction IDs of the handling consent re-records referenced by the handling execution record of the block 309 are the ID 03 (block 303) and the ID 05 (block 305), and therefore the blocks 303 and 305 are acquired from the blockchain system. If either one of the handling consent re-records does not exist on the blockchain, the verifier 113 detects an inconsistency (S144). Alternatively, it is also possible for the verifier 113 to detect an inconsistency if neither of the handling consent re-records exist on the blockchain, and not detect an inconsistency if either one of the handling consent re-records exists.

In the handling execution record of the block 309, the type of handling is "receipt" and the BC user ID is "company1". For this reason, the verifier 113 confirms that, in the handling consent re-record of the block 303, the type of handling is "disclosure" and the recipient is "company1". If at least one of the type of handling or the recipient does not exist or is different, the verifier 113 detects an inconsistency. Since the provider is "dealer1" in the handling consent re-record of the block 303, the verifier 113 confirms that, in the handling consent re-record of acquisition in the block 305, the type of handling is "acquisition" and the handling party is "dealer1". If at least one of the type of handling or the handling party does not exist or is different, the verifier 113 concludes that a relevant handling consent re-record does not exist, and detects an inconsistency (S144).

(Step S133)

The searcher 112 searches for a handling consent record corresponding to the handling consent re-record acquired in step S132. Here, the verification apparatus 105 has identifier correspondence information including a correspondence relationship between a BC user ID serving as an identifier for a using party and a BC user ID of an ordinary identifier (pseudonym or real name). From the BC user ID "g7h8i9" of the block 303, the searcher 112 uses the identifier correspondence information to acquire the corresponding BC user ID "hanako" of the ordinary identifier. The searcher 112 searches for a handling consent record in which the BC user ID is "hanako" and the other fields match the block 303 except for the transaction ID and the type of record, and acquires the block 301. Similarly, the searcher 112 searches for a handling consent record in which the BC user ID is "hanako" and the other fields match the block 305 except for the transaction ID and the type of record, and acquires the block 300. The verifier 113 detects an inconsistency if at least one of the handling consent records does not exist. Alternatively, it is also possible for the verifier 113 to detect an inconsistency if neither of the handling consent records exist on the blockchain, and not detect an inconsistency if either one of the handling consent records exists.
(Step S134)

The searcher 112 searches for a handling consent record in which the BC user ID, type of record, type of handling, and handling party match the handling consent record (block 301) and the status is non-consent, and acquires the block 316.
(Step S135)

The searcher 112 searches for a handling consent record in which the BC user ID, type of record, type of handling, and handling party match the handling consent record (block 300) and the status is non-consent, and acquires the block 313.
(Step S136)

The searcher 112 searches for a handling execution record of acquisition referencing the handling consent record of acquisition (block 300), and acquires the block 307.
(Step S137)

The searcher 112 searches for a handling execution record of disclosure in which the disclosure consent ID is the same ID 03 as the handling execution record of receipt (block 309), and acquires the block 308. If a handling execution record of disclosure does not exist, the verifier 113 detects an inconsistency.
(Step S138)

The searcher 112 searches for a handling execution record of deletion referencing the handling consent record with the status of non-consent (block 313), and acquires the block 318.
<Acquire Consent Period and Non-Consent Period>
(Step S139)

The period calculator 114 calculates the consent period and the non-consent period on the basis of the handling consent records acquired in the steps so far. In this example, a plurality of handling consent records have been acquired, and therefore a period during which the respective periods of consent overlap is treated as the consent period. More specifically, the process is as follows.

The block 303 referenced by the block 309 is a handling consent re-record, and the handling consent record corresponding to the handling consent re-record is the block 301. In the handling consent record of the block 301, the type of handling is "disclosure", the status is "consent", and the validity date is "Aug. 12, 2021". The handling consent record having the oldest validity date on or after the above validity date, and in which the type of handling is "disclosure" and the status is "non-consent", is the block 316. The validity date of the block 316 is "Aug. 20, 2021". Therefore, the consent period of "disclosure" is taken to be "Aug. 12-19, 2021".

The block 305 referenced by the block 309 is a handling consent re-record, and the handling consent record corresponding to the handling consent re-record is the block 300. In the handling consent record of the block 300, the type of handling is "acquisition", the status is "consent", and the validity date is "Aug. 11, 2021". The handling consent record having the oldest validity date on or after the above validity date, and in which the type of handling is "acquisition" and the status is "non-consent", is the block 313. The validity date of the block 313 is "Aug. 20, 2021". The consent period of "acquisition" is taken to be "Aug. 11-19, 2021".

The period during which the consent period of "acquisition" and the consent period of "disclosure" overlap is treated as the consent period and set to "Aug. 12-19, 2021".
<Determine Consistency on Basis of Records and Consent Period>
(Step S140)

The verifier 113 determines whether the handling date of the handling execution record to be verified is included in the consent period.

If the handling date is not included in the consent period, the verifier 113 detects an inconsistency (S144). If the handling date is included in the consent period, the flow proceeds to the next step S141.

In this example, the handling date of the handling execution record to be verified is Aug. 14, 2021, from the block 309, and the consent period is "Aug. 12-19, 2021". Since the handling date is included in the consent period, the verifier 113 does not detect an inconsistency. Consequently, the flow proceeds to the next step S141.
(Step S141)

The verifier 113 determines whether the handling date of the handling execution record of the receipt of data is after the acquisition or receipt of the data by the providing party. If the handling date is before the acquisition or receipt, the verifier 113 detects an inconsistency (S144). The verifier 113 also determines whether the handling date of acquisition or receipt is included in the consent period of "acquisition" or "disclosure", and if not included in the consent period of "acquisition" or "disclosure", the verifier 113 detects an inconsistency (S144). If the handling date is on or after the acquisition or receipt and the handling date of acquisition or receipt is included in the consent period of "acquisition" or "disclosure", the flow proceeds to the next step S142.

In this example, the handling date of the handling execution record of receipt (block 309) to be verified is Aug. 14, 2021. The handling date of the handling execution record of acquisition (block 307) is Aug. 13, 2021. Accordingly, since receipt occurred after acquisition and the acquisition occurred within the consent period of "acquisition", the verifier 113 does not detect an inconsistency. Consequently, the flow proceeds to the next step S142.
(Step S142)

The verifier 113 determines whether a handling execution record of deletion exists between the handling execution record of acquisition and the handling execution record of receipt. If a handling execution record of deletion exists, the verifier 113 detects an inconsistency (S144), and if not, the flow proceeds to step S143. In this example, the handling date of the handling execution record of deletion (block 318) is Aug. 20, 2021. A handling execution record of deletion does not exist between the handling execution record of acquisition and the handling execution record of receipt, and therefore an inconsistency is not detected.
(Step S143)

The verifier 113 determines whether the handling date of the handling execution record of receipt matches the handling date of the handling execution record of disclosure corresponding to the handling execution record of receipt. If the handling dates are not the same, the verifier 113 detects an inconsistency (S144). If the handling dates are the same, the verifier 113 determines that an inconsistency does not exist with respect to the handling execution record to be verified (S145).

In this example, the handling dates of the handling execution record of receipt (block 309) and the handling execution record of disclosure (block 308) corresponding to the handling execution record of receipt are both Aug. 14, 2021, and the handling dates match. Accordingly, it is determined that an inconsistency does not exist with respect to the handling execution record to be verified (block 309) (S145).

If an inconsistency is determined not to exist in step S145, the transmitter 115 transmits information indicating that an inconsistency was not detected to the requester apparatus as a verification result. If an inconsistency is detected in step S144, the transmitter 115 transmits information indicating that an inconsistency was detected to the requester apparatus as a verification result. At this time, the verification result may also include the reason why an inconsistency was detected.

VERIFICATION EXAMPLE 2: VERIFICATION BY BC USER ID SERVING AS IDENTIFIER FOR USING PARTY, STARTING FROM HANDLING EXECUTION RECORD OF RECEIPT

Figure 10:
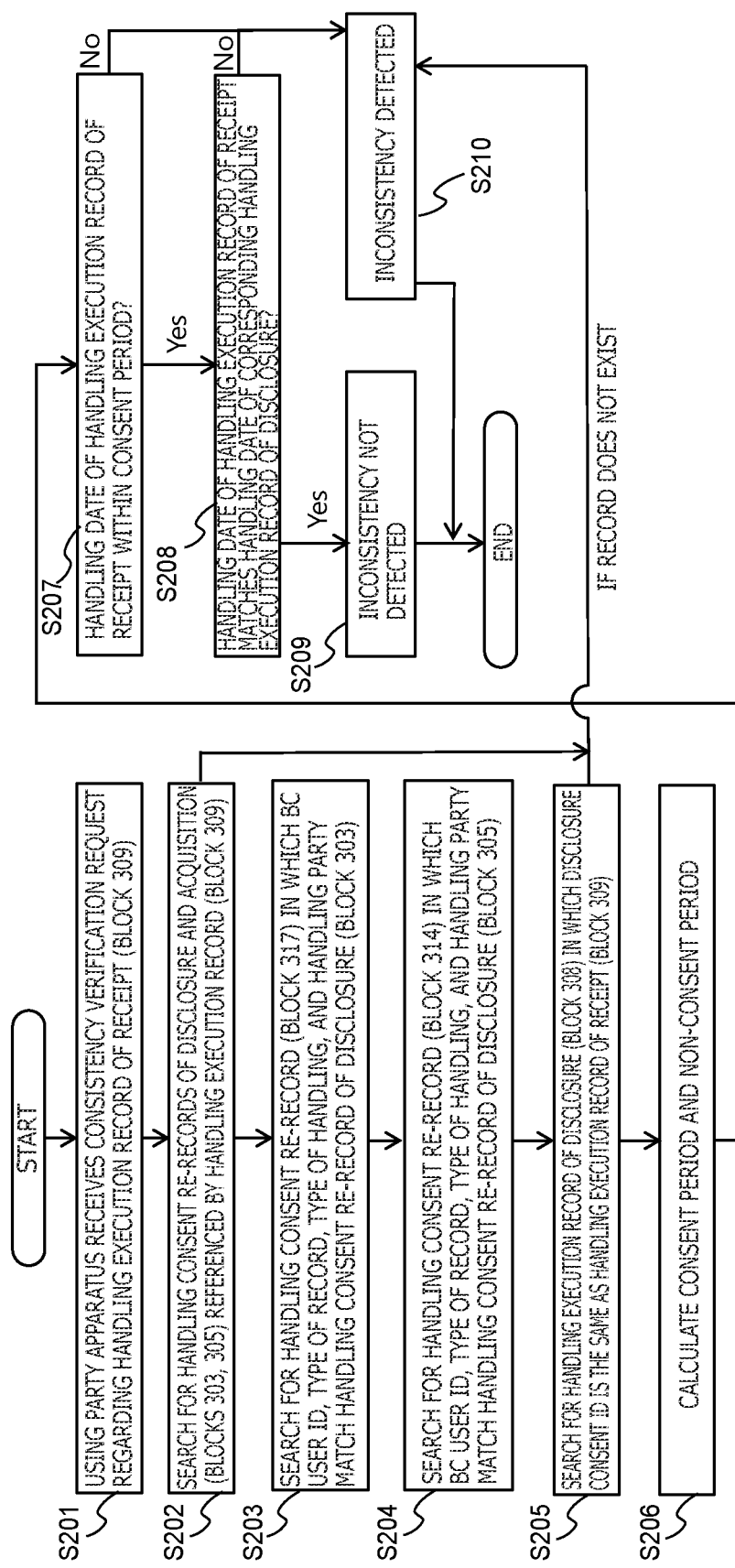
FIG. 10 is a flowchart of one example of operations in Verification Example 2.

This example assumes that the verification apparatus 105 is the using party apparatus 103, but the verification apparatus 105 may also be any of the related party apparatus, the handling party apparatus, or the using party apparatus, or some other information processing apparatus. FIG. 10 is a flowchart of one example of operations in Verification Example 2.

(Step S201)

The receiver 111 receives a consistency verification request regarding the handling execution record of receipt indicated in the block 309.

<Acquire Related Handling Consent Records and Handling Execution Records>

(Step S202)

The searcher 112 searches for a handling consent re-record of disclosure and a handling consent re-record of acquisition related to the handling execution record of receipt to be verified. With this step, the blocks 303 and 305 are acquired. If either one of the handling consent re-records does not exist on the blockchain, the verifier 113 detects an inconsistency (S210). Alternatively, it is also possible for the verifier 113 to detect an inconsistency if neither of the handling consent re-records exist on the blockchain, and not detect an inconsistency if either one of the handling consent re-records exists. This step is the same as step S132 in FIG. 8.

(Step S203)

The searcher 112 searches for a handling consent re-record in which the BC user ID, type of record, type of handling, and handling party are the same as the handling consent re-record of disclosure (block 303), and acquires the block 317.

(Step S204)

The searcher 112 searches for a handling consent re-record in which the BC user ID, type of record, type of handling, and handling party are the same as the handling consent re-record of acquisition (block 305), and acquires the block 314.

(Step S205)

The searcher 112 searches for a handling execution record of disclosure in which the disclosure consent ID is the same as the handling execution record of receipt (block 309), and acquires the block 308. If a handling execution record of disclosure does not exist, the verifier 113 detects an inconsistency (S210).

<Acquire Consent Period and Non-Consent Period>

(Step S206)

The period calculator 114 acquires the consent period and the non-consent period on the basis of the handling consent re-records acquired in the steps so far. In this example, a plurality of handling consent re-records have been acquired, and therefore a period during which the periods of the handling consent re-records overlap is treated as the consent period.

The block 303 referenced by the block 309 is a handling consent re-record, the type of handling is "disclosure", the status is "consent", and the validity date is "Aug. 12, 2021". The handling consent re-record having the oldest validity date on or after the above validity date, and in which the type of handling is "disclosure" and the status is "non-consent", is the block 317. The validity date of the block 317 is "Aug. 20, 2021". Therefore, the consent period of "disclosure" is taken to be "Aug. 12-19, 2021".

The block 305 referenced by the block 309 is a handling consent re-record, the type of handling is "acquisition", the status is "consent", and the validity date is "Aug. 11, 2021". The handling consent re-record having the oldest validity date on or after the above validity date, and in which the type of handling is "acquisition" and the status is "non-consent", is the block 314. The validity date of the block 314 is "Aug. 20, 2021". Therefore, the consent period of "acquisition" is taken to be "Aug. 11-19, 2021". The period during which the consent period of "acquisition" and the consent period of "disclosure" overlap is treated as the consent period, and the consent period is "Aug. 12-19, 2021".

<Determine Consistency on Basis of Records and Consent Period>

(Step S207)

The verifier 113 determines whether or not the handling date of the handling execution record to be verified is included in the consent period. If the handling date is not included in the consent period, the verifier 113 detects an inconsistency (S210). If the handling date is included in the consent period, the flow proceeds to the next step S208.

In this example, since the handling date of the handling execution record of receipt indicated by the block 309 to be verified is Aug. 14, 2021, and is included in the consent period "Aug. 12-19, 2021", an inconsistency is not detected. Therefore, the flow proceeds to step S208.

(Step S208)

The verifier 113 determines whether the handling date of the handling execution record of receipt matches the handling date of the handling execution record of disclosure corresponding to the handling execution record of receipt. If the handling dates are not the same, the verifier 113 detects an inconsistency. If the handling dates are the same, the verifier 113 determines that an inconsistency does not exist (S209). In this example, it is determined that an inconsistency does not exist, similarly to step S133 in FIG. 8.

VERIFICATION EXAMPLE 3: VERIFICATION BASED ON ORDINARY (REAL NAME OR PSEUDONYM) BC USER ID, STARTING FROM RECORD OF USAGE

Figure 11:
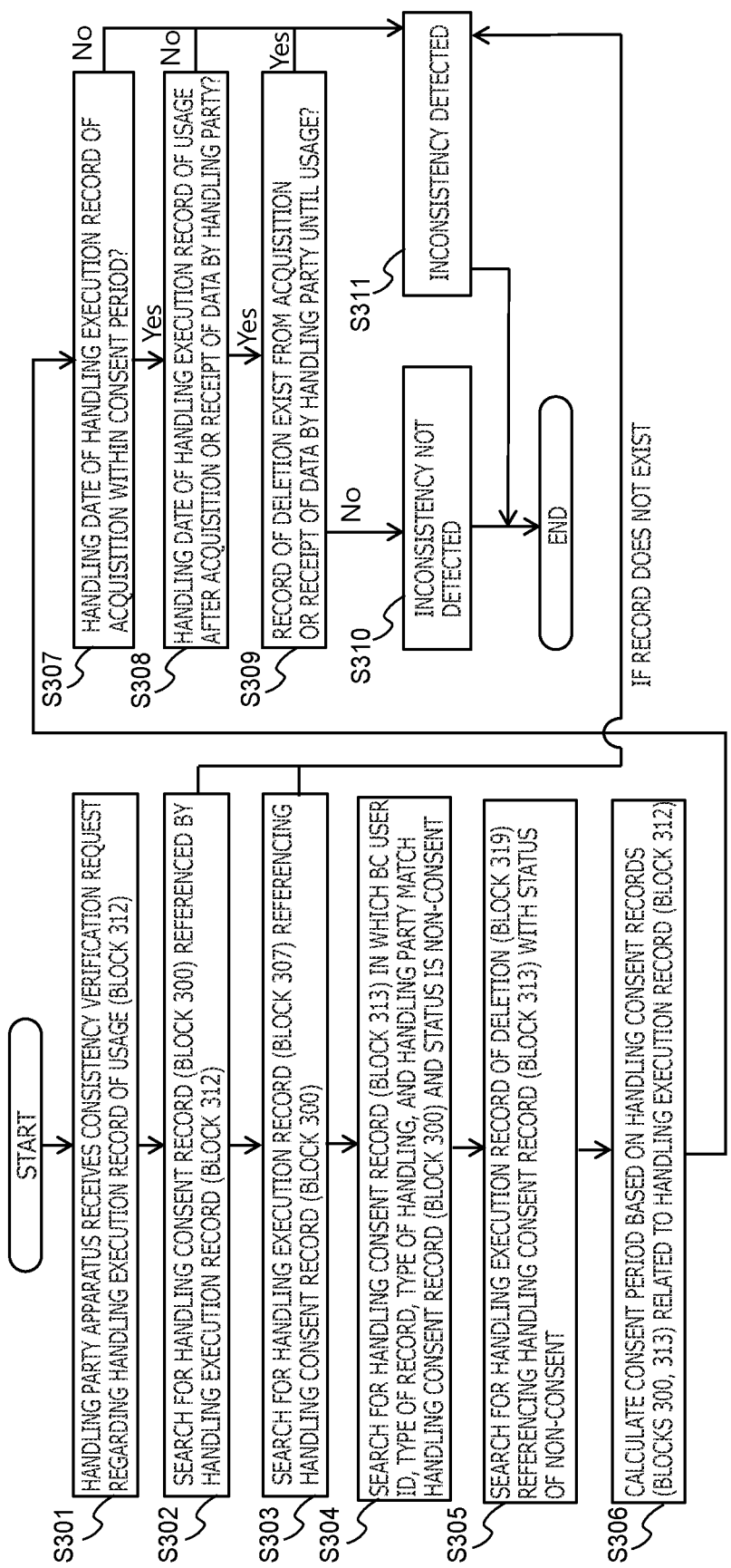
FIG. 11 is a flowchart of one example of operations in Verification Example 3.

This example assumes that the verification apparatus 105 is the handling party apparatus 102, but the verification apparatus 105 may also be the related party apparatus or the using party apparatus, or some other information processing apparatus. FIG. 11 is a flowchart of one example of operations in Verification Example 3.

(Step S301)

The receiver 111 receives a consistency verification request regarding the handling execution record of usage indicated in the block 312.

<Acquire Related Handling Consent Records and Handling Execution Records>

(Step S302)

The searcher 112 searches for a handling consent record and a handling execution record related to the handling execution record to be verified. More specifically, the searcher 112 searches for the handling consent record referenced by the handling execution record of the block 312, and acquires the block 300 from the blockchain system. If a handling consent record does not exist on the blockchain, the verifier 113 detects an inconsistency (S311). In the handling execution record of the block 312, the type of handling is "usage" and the BC user ID is "dealer1". For this reason, the verifier 113 determines whether the handling consent record of the block 300 satisfies either the condition that the type of handling is "acquisition" and the handling party is "dealer1" or the condition that the type of handling is "disclosure" and the recipient is "dealer1". If neither of the conditions is satisfied, the verifier 113 concludes that a relevant handling consent record does not exist, and detects an inconsistency (S311). In this example, in the handling consent record referenced by the block 312, the type of handling is "acquisition" and the handling party is "dealer1", and therefore the former condition is satisfied.

(Step S303)

The searcher 112 searches for a handling execution record referencing the handling consent record (block 300), and acquires the block 307.

(Step S304)

The searcher 112 searches for a handling consent record in which the BC user ID, type of record, type of handling, and handling party match the handling consent record (block 300) and the status is non-consent, and acquires the block 313.

(Step S305)

The searcher 112 searches for a handling execution record of deletion referencing the handling consent record with the status of non-consent (block 313), and acquires the block 318.

<Acquire Consent Period and Non-Consent Period>

The period calculator 114 acquires the consent period and the non-consent period on the basis of the handling consent records acquired in the steps so far.

(Step S306)

In the handling consent record of the block 300 referenced by the block 312 to be verified, the type of handling is "acquisition", the status is "consent", and the validity date is "Aug. 11, 2021". The handling consent record having the oldest validity date on or after the above validity date, and in which the type of handling is "acquisition" and the status is "non-consent", is the block 313. The validity date of the block 313 is "Aug. 20, 2021". Therefore, the consent period is taken to be "Aug. 11-19, 2021".

<Determine Consistency From Records and Consent Period>

(Step S307)

The verifier 113 determines whether the handling date of the handling execution record to be verified is included in the consent period. If the handling date is not included in the consent period, the verifier 113 detects an inconsistency (S311). If the handling date is included in the consent period, the flow proceeds to the next step S308.

In this example, the handling date of the handling execution record of usage indicated by the block 312 to be verified is Aug. 15, 2021, and is included in the consent period "Aug. 12-19, 2021". Therefore, an inconsistency is not detected at this time, and the flow proceeds to the next step S308.

(Step S308)

The verifier 113 determines whether the handling date of the handling execution record of usage is on or after the acquisition or receipt, by the handling party, of the data related to the usage. If the handling date is before the acquisition or receipt, the verifier 113 detects an inconsistency (S311). Also, if the acquisition or receipt is not included in the consent period, the verifier 113 likewise detects an inconsistency (S311). On the other hand, if the handling date is on or after the acquisition or receipt and the acquisition or receipt is within the consent period, the flow proceeds to the next step S309.

In this example, the handling date of the handling execution record of usage (block 312) to be verified is Aug. 15, 2021. The handling date of the handling execution record of acquisition (block 307) is Aug. 13, 2021. Accordingly, usage occurs after acquisition, and the acquisition is within the consent period. Consequently, an inconsistency is not detected, and the flow proceeds to the next step S309.

(Step S309)

The verifier 113 determines whether a handling execution record of deletion exists between the handling date of the handling execution record of acquisition and the handling date of the handling execution record of receipt. If a handling execution record of deletion exists, the verifier 113 detects an inconsistency (S311). If a handling execution record of deletion does not exist, the verifier 113 determines that an inconsistency does not exist with respect to the handling execution record of usage to be verified (S310).

In this example, the handling date of the handling execution record of deletion (block 320) is Aug. 20, 2021, and a handling execution record of deletion does not exist between acquisition and receipt. Accordingly, the verifier 113 determines that an inconsistency does not exist with respect to the handling execution record to be verified (S310).

VERIFICATION EXAMPLE 4: VERIFICATION BASED ON ORDINARY (REAL NAME OR PSEUDONYM) BC USER ID, STARTING FROM RECORD OF DELETION

Figure 12:
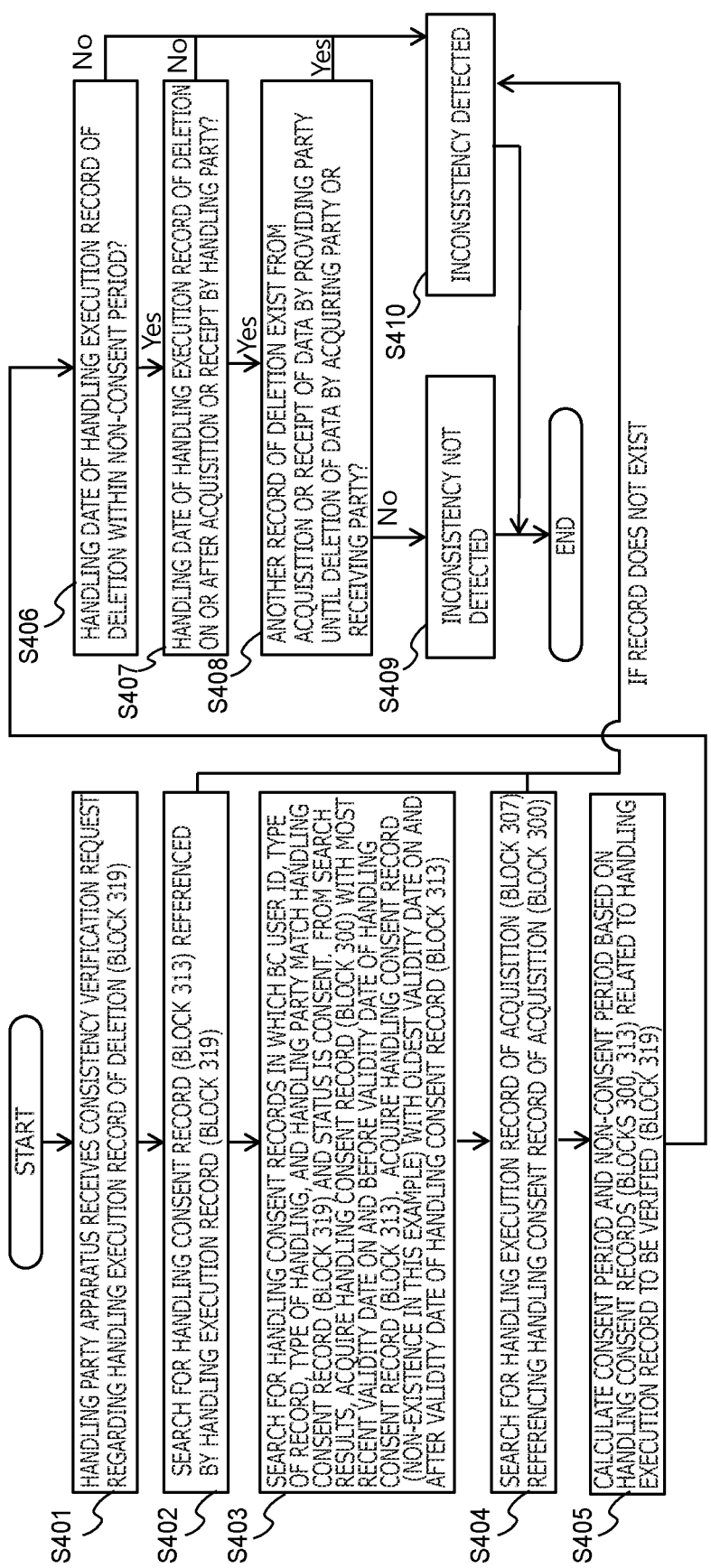
FIG. 12 is a flowchart illustrating one example of operations in Verification Example 4.

This example assumes that the verification apparatus 105 the handling party apparatus 102, but the verification apparatus 105 may also be any of the related party apparatus, the handling party apparatus, or the using party apparatus, or some other information processing apparatus. FIG. 12 is a flowchart illustrating one example of operations in Verification Example 4.

(Step S401)

The receiver 111 receives a consistency verification request regarding the handling execution record of deletion indicated in the block 318.

<Acquire Related Handling Consent Records and Handling Execution Records>

(Step S402)

The searcher 112 searches for a handling consent record related to the handling execution record of deletion to be verified. If a handling consent record does not exist on the blockchain, the verifier 113 detects an inconsistency (S410).

In this example, the searcher 112 searches for the handling consent record referenced by the handling execution record of the block 318, and acquires the block 313 from the blockchain system.

In the handling execution record of the block 318, the type of handling is "deletion" and the BC user ID is "dealer1". For this reason, the verifier 113 determines whether the handling consent record being referenced satisfies either the condition that the type of handling is "acquisition", the handling party is "dealer1", and the status is "non-consent" or the condition that the type of handling is "receipt", the recipient is "dealer1", and the status is "non-consent". If either condition is satisfied, the flow proceeds to the next step S403. If neither condition is satisfied, the verifier 113 detects an inconsistency (S410). In this example, the former condition is satisfied, and therefore the flow proceeds to step S403. In this example, the type of handling in the handling consent record referenced by the block 313 is "acquisition", but the case where the type of handling is "receipt" is also similar.

(Step S403)

The searcher 112 searches for handling consent records in which the BC user ID, type of record, type of handling, and handling party match the handling consent record (block 313) and the status is consent. From the handling consent records found by the search (the search results), the handling consent record (block 300) with the most recent validity date occurring on or before the validity date of the handling consent record (block 313) is acquired. Also, the handling consent record with the oldest validity date occurring on or after the validity date of the handling consent record (block 313) is acquired (in this example, a corresponding handling consent record does not exist).

(Step S404)

The searcher 112 searches for a handling execution record referencing the handling consent record (block 300), and acquires the block 307 from the blockchain.

<Acquire Consent Period and Non-Consent Period>

(Step S405)

The period calculator 114 acquires the consent period and the non-consent period on the basis of the handling consent records acquired in the steps so far. In this example, on the basis of the block 300 and the block 313, the consent period is taken to be Aug. 11-19, 2021, and the non-consent period is taken to be the period from Aug. 20, 2021, up to the time of verification. Note that if a block containing a handling consent record indicating consent again is written to the blockchain after the validity date of the handling consent record for rescinding consent indicated by the block 318, the non-consent period may be treated as the period from the validity date of the handling consent record for rescinding consent until consent is given again.

<Determine Consistency on Basis of Records and Consent Period>

(Step S406)

The verifier 113 determines whether the handling date of the handling execution record of deletion to be verified is included in the non-consent period. If the handling date is not included in the non-consent period, the verifier 113 detects an inconsistency (S410). If the handling date is included in the non-consent period, the verifier 113 does not detect an inconsistency, and proceeds to the next step S407.

In this example, the handling date of the handling execution record of the block 318 to be verified is Aug. 20, 2021, which is included in the non-consent period "from Aug. 20, 2021, up to the time of verification", and therefore an inconsistency is not detected, and the flow proceeds to the next step S407.

(Step S407)

The verifier 113 determines whether the handling date of the handling execution record of the deletion of data is on or after the acquisition or receipt of the data by the handling party. If the handling date is before the acquisition or receipt, the verifier 113 detects an inconsistency (S410). Also, it is determined whether the acquisition or receipt is included in the consent period, and if not, the verifier 113 detects an inconsistency (S410). If the handling date of the deletion is on or after the handling date of acquisition or receipt and the acquisition or receipt is included in the consent period, the verifier 113 does not detect an inconsistency, and proceeds to the next step S408.

In this example, the handling date of the handling execution record of deletion (block 318) to be verified is Aug. 20, 2021. The handling date of the handling execution record of acquisition (block 307) is Aug. 13, 2021. Accordingly, deletion occurred after acquisition. Moreover, the acquisition is included in the consent period. Therefore, the verifier 113 does not detect an inconsistency and proceeds to the next step S408.

(Step S408)

The verifier 113 determines whether another handling execution record of deletion exists between the handling execution record of deletion and the handling execution record of receipt (or acquisition). If another handling execution record of deletion exists, the verifier 113 detects an inconsistency (S410). If another handling execution record of deletion does not exist, the verifier 113 determines that an inconsistency does not exist with respect to the handling execution record of deletion to be verified (S409).

In this example, the handling date of the handling execution record of deletion (block 318) is Aug. 20, 2021, and the handling date of the handling execution record of acquisition (block 307) is Aug. 13, 2021.

Since another handling execution record of deletion does not exist between the handling execution record of acquisition and the handling execution record of deletion, the verifier 113 determines that an inconsistency does not exist (S409).

VERIFICATION EXAMPLE 5: VERIFICATION BASED ON ORDINARY (REAL NAME OR PSEUDONYM) BC USER ID, STARTING FROM RESCINDING OF CONSENT TO ACQUISITION

Figure 13:
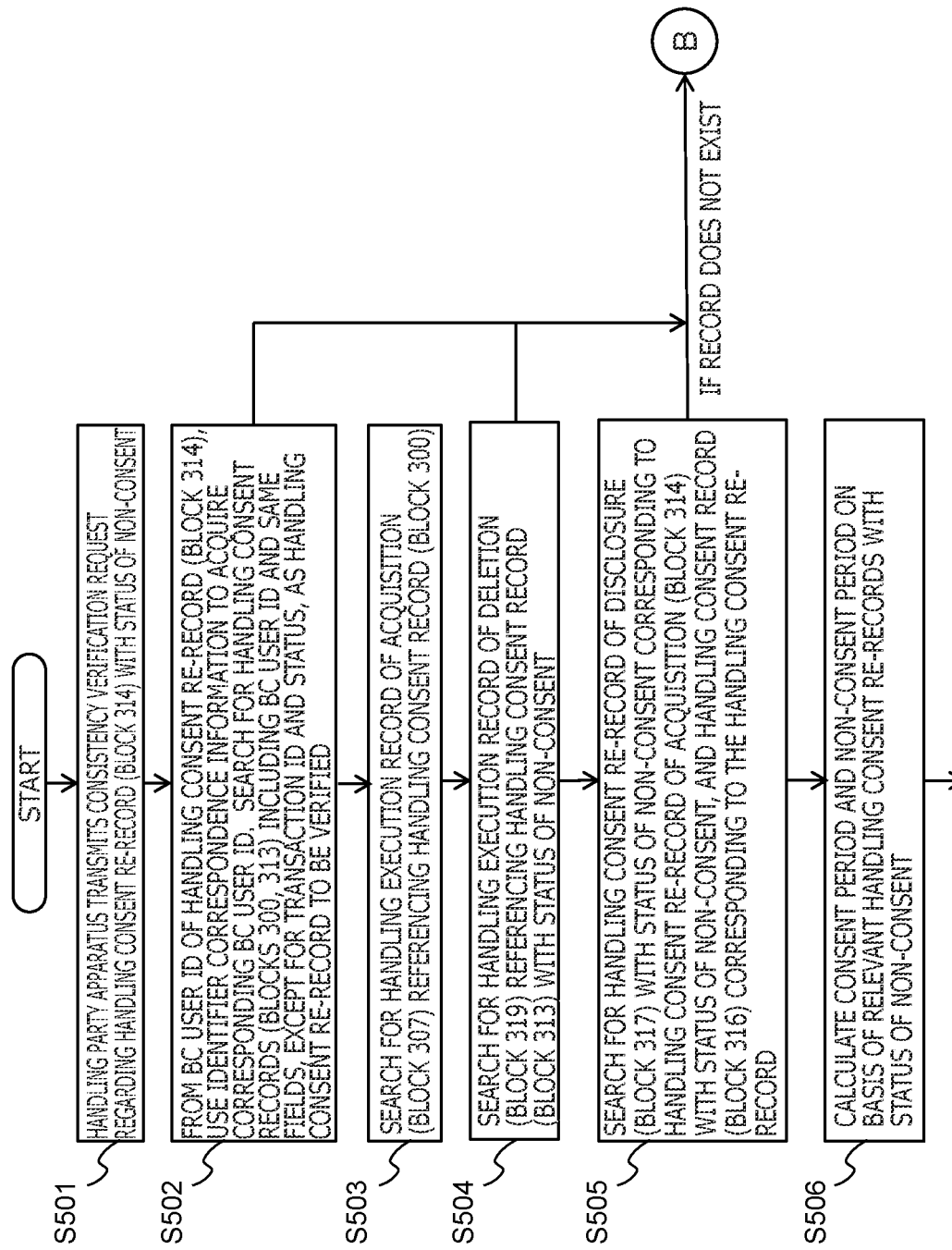
FIG. 13 is a flowchart illustrating one example of operations in Verification Example 5.
Figure 14:
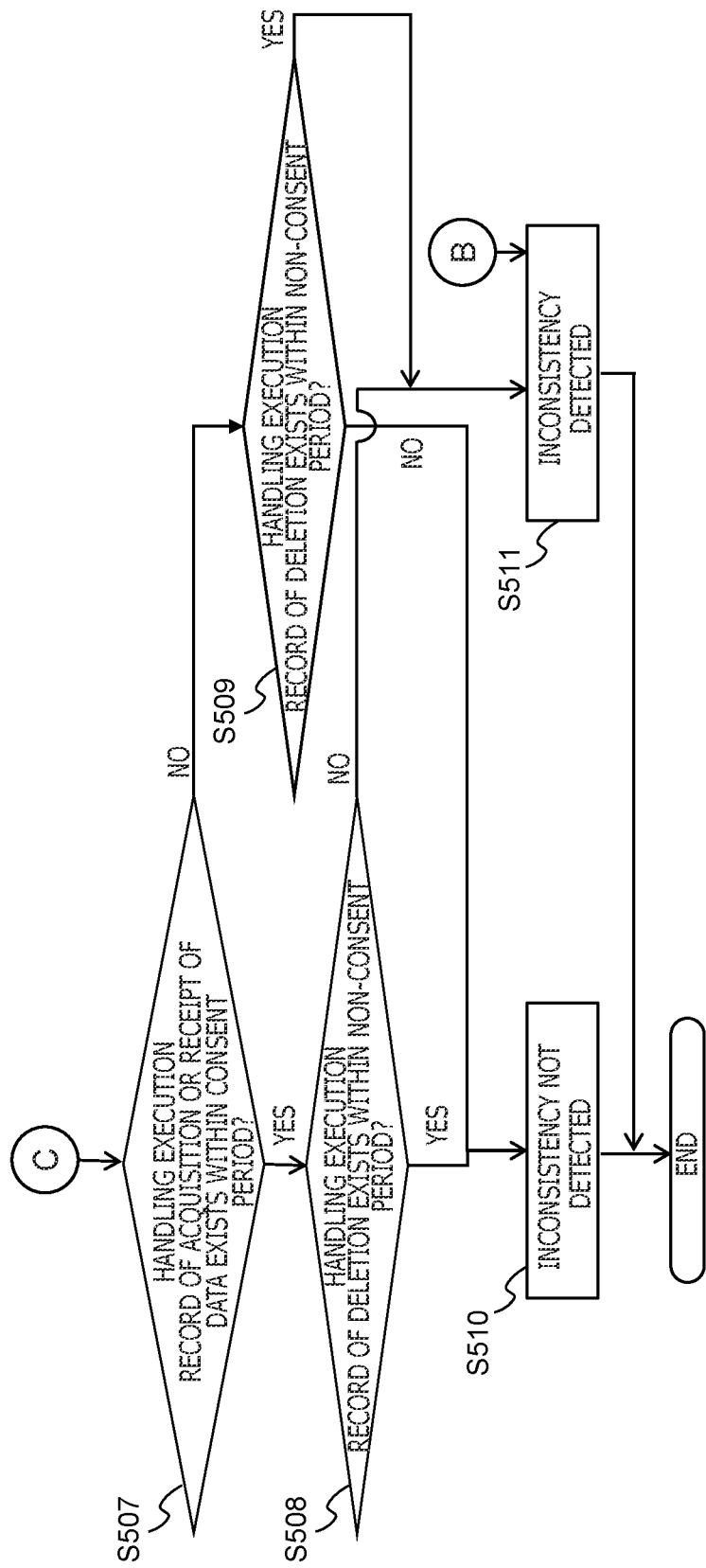
FIG. 14 is a continuation of the flowchart in FIG. 13.

This example assumes that the verification apparatus 105 is the handling party apparatus 102, but like Examples 1 to 4, the verification apparatus 105 may also be another apparatus. FIG. 13 is a flowchart illustrating one example of operations in Verification Example 5. FIG. 14 is a continuation of the flowchart in FIG. 13.

The receiver 111 receives a consistency verification request regarding the handling consent re-record (block 314) with the status of non-consent (step S501).

<Acquire Related Handling Consent Records and Handling Execution Records>

(Step S502)

From the BC user ID serving as the identifier of the using party in the handling consent re-record to be verified, the searcher 112 uses the identifier correspondence information to acquire the corresponding BC user ID of the ordinary (real name or pseudonym) identifier. The searcher 112 searches for a handling consent record having the acquired BC user ID of the ordinary identifier and in which the other fields are the same as the handling consent re-record except for the transaction ID and the status.

In this example, from the BC user ID "g7h8i9" of the handling consent re-record (block 314), the searcher 112 uses the identifier correspondence information to acquire the corresponding BC user ID "hanako" of the ordinary identifier. The searcher 112 searches for a handling consent record in which the BC user ID is "hanako" and the other fields are the same as the handling consent re-record (block 314) except for the transaction ID and the status. With this step, the block 300 and the block 313 are acquired.

(Step S503)

The searcher 112 searches for a handling execution record referencing the handling consent record (block 300), and acquires the block 307.

(Step S504)

The searcher 112 searches for a handling execution record of deletion referencing the handling consent record with the status of non-consent (block 313), and acquires the block 318. If a handling execution record does not exist on the blockchain, an inconsistency is detected.

(Step S505)

If consent to acquisition has been rescinded (block 314), consent to disclosure must be rescinded. The searcher 112 searches for a handling consent re-record of disclosure corresponding to the handling consent re-record (block 314). The searcher 112 searches for a handling consent re-record in which the BC user ID is "g7h8i9", the type of record is "handling consent re-", the type of handling is "disclosure", the provider is the handling party "dealer1" in the block 314, and the validity date is on or before the validity date in the block 314. With this step, the block 317 is acquired.

From the BC user ID "g7h8i9" in the handling consent re-record of the block 317, the searcher 112 uses the identifier correspondence information to acquire the corresponding identifier "hanako". The searcher 112 searches for a handling consent record in which the BC user ID is "hanako" and the fields except for the transaction ID are the same as the handling consent re-record (block 317), and acquires the block 316. If a handling consent record and a handling consent re-record do not exist on the blockchain, the verifier 113 detects an inconsistency (S511).

<Acquire Consent Period and Non-Consent Period>
(Step S506)

The period calculator 114 acquires the consent period and the non-consent period on the basis of the handling consent records acquired in the steps so far.

On the basis of the blocks 300 and 313, the consent period is taken to be Aug. 11-19, 2021. The non-consent period is taken to be "the period from Aug. 20, 2021, up to the time of verification".

<Detect Inconsistency From Records and Consent Period>
(Step S507)

If a handling execution record of the acquisition or receipt of data included in the consent period exists on the blockchain, the flow proceeds to step S508, whereas if not, the flow proceeds to step S509.

In this example, a corresponding handling execution record of the acquisition of data (block 307) exists, and therefore the flow proceeds to step S508.

(Step S508)

The verifier 113 determines whether a handling execution record of deletion exists in the non-consent period. If such a record exists, an inconsistency is not detected (S510), whereas if such a record does not exist, the verifier 113 detects an inconsistency (S511). In this example, the handling execution record of deletion (block 318) containing the handling date "Aug. 20, 2021" within the non-consent period "from Aug. 20, 2021, up to the time of verification" exists, and therefore an inconsistency is not detected.

(Step S509)

The verifier 113 determines whether a handling execution record of deletion exists in the non-consent period. If such a record exists, an inconsistency is detected (S511), whereas if such a record does not exist, an inconsistency is not detected (S510).

FIGS. 13 and 14 illustrate the case of receiving a consistency verification request regarding the handling consent re-record (block 314) with the status of non-consent. Since the block to be verified uses the identifier of the using party (in this example, "g7h8i9"), the above verification focuses on the identifier of the using party. In the case of receiving a consistency verification request regarding the handling consent record (block 313) also with the status of non-consent, since the block to be verified uses the ordinary ID, all corresponding identifiers for using parties are verified, and a search for handling consent re-records (blocks 314, 315) having identifiers (in this example, "g7h8i9" and "j1k2m3") that correspond to the BC user ID "hanako" is performed (search 1). A search for a handling consent record of disclosure (block 316) with a status of non-consent which corresponds to the handling consent record (block 313) with the status of non-consent is performed (search 2). Also, a search for a handling consent re-record of disclosure (block 317) in which the fields other than the transaction ID are the same as the handling consent record (block 316) and the BC user ID is the identifier of the using party is performed (search 3). If a corresponding record does not exist in the searches 1 to 3, the verifier 113 may detect an inconsistency. In the example of the blockchain in FIGS. 2 and 3, from among the handling consent records of disclosure with the status of non-consent, a record in which the BC user ID is "j1k2m3", the provider is "dealer1", and the recipient is "company2" does not exist according to the search 3, and therefore the verifier 113 detects an inconsistency.

[Modification 1]

In each of the verification examples described above, the consent period and the non-consent period are set on the basis of the validity dates included in the handling consent records, but an embodiment is not limited to this method. For example, a handling consent record may be treated as valid (the validity period starts) from the time point at which the handling consent record is written. Alternatively, time information or timestamp information added to a handling consent record or a block may be used. Alternatively, the order of blocks may be used. A consent period and a non-consent period may also be recorded to the state of the blockchain, and the recorded consent period and non-consent period may be acquired.

[Modification 2]

In the consistency verification in the case of the example of records illustrated in FIG. 6 described above, the acquisition circumstances ID may be used instead of the acquisition consent ID in the record of receipt in the verification examples described above, and an inconsistency may be detected if the block indicated by the acquisition circumstances ID does not exist.

[Modification 3]

By referencing handling consent information in a handling execution record, content that is a duplicate of the handling consent information may be omitted from inclusion in the handling execution record. Alternatively, the duplicate content does not have to be omitted,

[Modification 4]

Detailed data fields and the purpose of use may also be included in handling consent records and handling execution records. Data field examples include medical information, measurement results, blood test results, and findings. Purpose of use examples include commercial purposes and research purposes, and may be detailed further. Data fields and purposes of use may also be structured hierarchically. For example, medical information may include measurement results, blood test results, and findings. Research may include a plurality of research (for example, research A and research B). When searching for a related handling consent record or handling execution record, a data field and purpose of use may also be included in the search condition. The range of the data field and purpose of use in a corresponding handling consent record may also be wider than the range of the data field and purpose of use in a handling execution record. For example, the data field included in a handling execution record may be blood test results, and the data field included in the corresponding handling consent record may be medical information. More generally, besides searching for a handling consent record or a handling execution record that matches the value of a field in a handling execution record or the value of a field designated by a search request, a search for a handling consent record or a handling execution record in which the value of a field is subsumed in the designated value of the field may also be performed,

[Modification 5]

In the case where the status of a handling consent record X is "consent", the consent is rescinded, and a handling consent record Y with the status of "non-consent is written, the handling consent record Y may also be configured to reference the handling consent record X. When searching for a related handling consent record, information about the referent may be used. For example, in a verification, by acquiring the handling consent record Y (first handling consent record) referenced by a handling execution record and then acquiring the handling consent record X (second handling consent record) referenced by the handling consent record Y, the content of the handling consent record Y may be checked. The handling consent record Y (first handling consent record) may indicate the rescinding of consent (status is "non-consent"), and the handling consent record X (second handling consent record) may indicate consent (status is "consent"). Also, in the case where at least one field in a handling execution record is the same as a field in the handling consent record Y or the handling consent record X, and the at least one field is omitted from the handling execution record, by referencing the related handling consent record Y or handling consent record X, the searcher 112 may specify the value of the at least one field omitted above.

[Modification 6]

In the flowcharts used in the descriptions of the verification examples described above, a handling consent record with the status of non-consent or handling execution record is initially designated as the record to be verified, but as another method, a designation method like the following may also be used.

A related party to be verified is designated. When designating a related party, one or some related parties may be designated, or all related parties may be designated. In the case where a handling execution record references a handling consent record and the BC user ID of the related party is omitted from the handling execution record, the BC user ID of the related party is specified from the referenced handling consent record, and a search for a handling consent record containing the BC user ID of the related party and a handling consent record containing a corresponding BC user ID according to the identifier correspondence information is performed. Furthermore, a search for a handling execution record referencing a handling consent record retrieved by the above search is performed. A handling consent record with the status of non-consent from among the handling consent records retrieved by the searches and all handling execution records retrieved by the searches are designated as records to be verified.

[Modification 7]

When performing a search, the search range (verification range) may also be designated on the basis of the record creation times or the block order. An already-verified range may also be recorded, and the next verification may only verify an unverified range. For example, the records up to a certain creation time may be recorded as an already-verified range, and records created after that time may be subjected to the next verification. The already-verified range may also be recorded as a number of blocks starting from the genesis block, and a block group starting from the next block may be subjected to the next verification.

[Modification 8]

The name of the owner of data and the name of a third-party recipient may also be included in a handling consent record or handling execution record, and this information may be referenceable from ordinary IDs.

In the embodiment described above, data is deleted after the rescinding of consent is confirmed, but data may also be put into a suspended state without being deleted. In this case, "deletion" may be substituted with "suspension" in the description of the present embodiment, and a process similar to the case of deletion may also be performed with respect to "suspension".

As above, according to the present embodiment, a handling consent record such as a handling consent record of disclosure related to handling that allows a third party (such as a using party) to use data is written to the blockchain with the identifier of the related party changed from an ordinary identifier (real name or pseudonym) to an identifier used exclusively for the using party. That is, a handling consent record containing the ordinary identifier (real name or pseudonym) before the identifier of the related party is changed is detected, the identifier of the related party in the detected handling consent record is changed to the identifier for the using party, and the changed handling consent record is written as a handling consent re-record. With this arrangement, even if the data is leaked from the third party (such as the using party), the party acquiring the leaked data will be unable to uniquely identify the data-related party (for example, the owner of the data), and the identification of the data-related party can be prevented. Moreover, even a party that only recognizes one of the identifiers before and after the change is able to transmit a verification request to the present information processing apparatus on the basis of the identifier to thereby check the complete circumstances, history, and the like of the disclosure of the data.

According to the present embodiment, inconsistencies between handling consent records and handling execution records can be detected. Moreover, even if the identifier of the related party is changed to the identifier for the using party, information about correspondence relationships between identifiers can be used to verify records. Furthermore, the information about correspondence relationships can also be used to verify the existence of a handling consent record that corresponds to a handling consent re-record in which the identifier of the related party is changed to the identifier for the using party. Even a party that only recognizes one of the identifiers before and after the change is able to transmit a verification request to the present information processing apparatus on the basis of the identifier to thereby detect an inconsistency between a handling consent record and a handling execution record corresponding to the identifier.

Note that at least a portion of the information processing apparatuses (verification apparatus, related party apparatus, handling party apparatus, using party apparatus) according to the above embodiment may also be achieved by a special-purpose electronic circuit (that is, hardware) such as an integrated circuit (IC) in which components such as a processor and a memory are implemented. Moreover, at least a portion of the above embodiment may also be achieved by executing software (a program). For example, the processes according to the above embodiment are achievable by using a general-purpose computer apparatus as the base hardware and causing a processor such as a CPU mounted in the computer apparatus to execute a program.

For example, by causing a computer to read out special-purpose software stored in a computer-readable storage medium, the computer can function as an apparatus according to the above embodiment. The type of the storage medium is not particularly limited. Furthermore, the computer can function as an apparatus according to the above embodiment by causing the computer to install special-purpose software downloaded over a communication network. In this way, information processing expressed as software is carried out concretely by using hardware resources.

Figure 15:
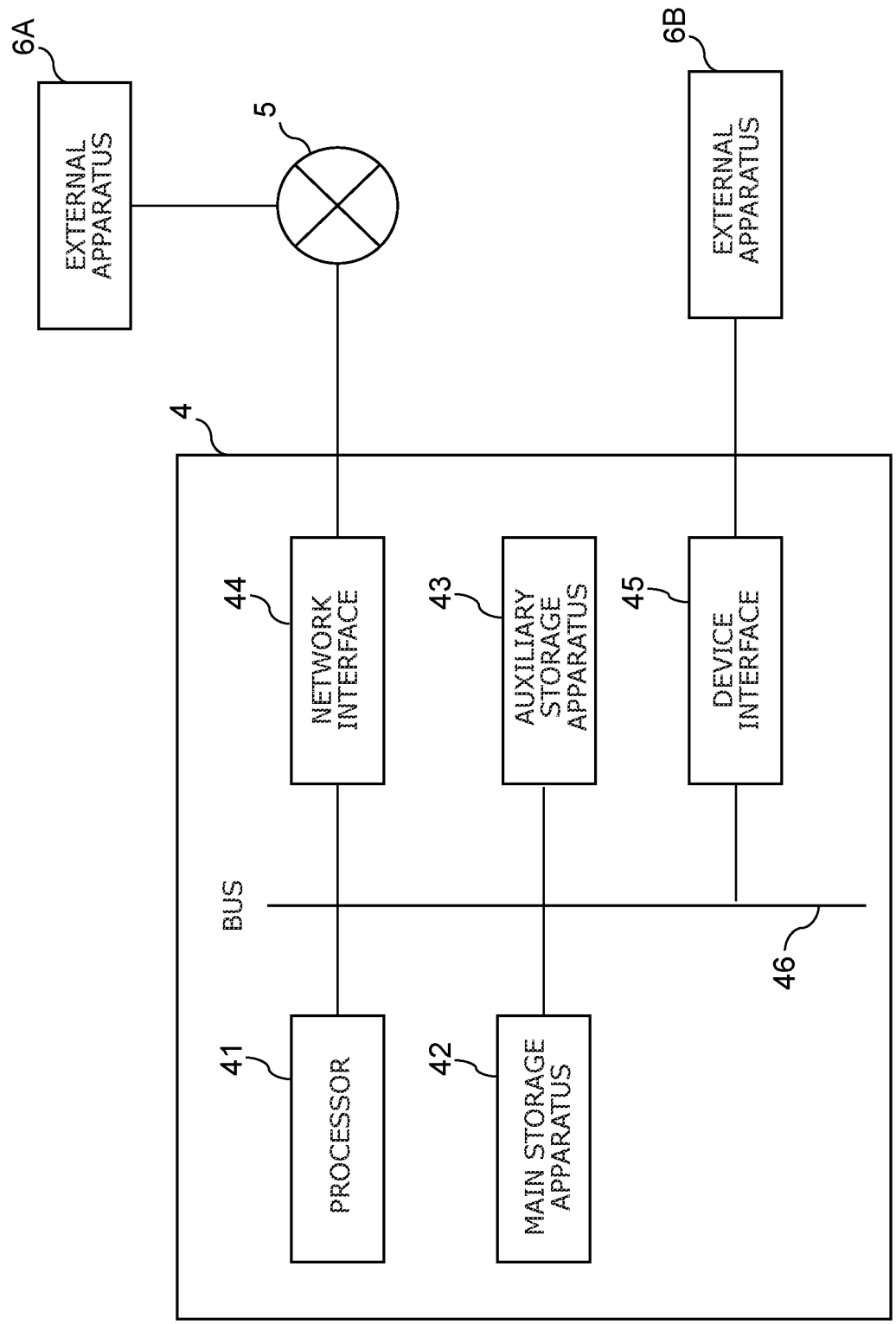
FIG. 15 is a block diagram illustrating an example of a hardware configuration according to an embodiment of the present invention.

FIG. 15 is a block diagram illustrating an example of a hardware configuration according to an embodiment of the present invention. The information processing apparatus according to the present embodiment (an verification apparatus, a related party apparatus, a handling party apparatus, and a using party apparatus) can be achieved as a computer apparatus 4 provided with a processor 41, a main storage apparatus 42, an auxiliary storage apparatus 43, a network interface 44, and a device interface 45 interconnected through a bus 46.

The processor 41 is an electronic circuit including a computer control apparatus and computational apparatus. The processor 41 performs computational processing on the basis of data and programs inputted from sources such as each apparatus in the internal configuration of the computer apparatus 4, and outputs a computational result or a control signal to destinations such as each apparatus. Specifically, the processor 41 executes programs such as an operating system (OS) and applications of the computer apparatus 4, and controls each apparatus forming the computer apparatus 4. The processor 41 is not particularly limited insofar as the above processing can be performed.

The main storage apparatus 42 is a storage apparatus that stores information such as command to be executed by the processor 41 and various data, and the information stored in the main storage apparatus 42 is read out directly by the processor 41. The auxiliary storage apparatus 43 is a storage apparatus other than the main storage apparatus 42. Note that these storage apparatuses refer to any electronic component capable of storing electronic information, and may be memory or storage. Also, the memory may be either or both of volatile memory and non-volatile memory.

The network interface 44 is an interface for connecting to a communication network 5 in a wired or wireless configuration. An interface conforming to an existing communication standard may be used as the network interface 44. Through the network interface 44, information may be exchanged with an external apparatus 6A communicably connected over the communication network 5.

The device interface 45 is an interface such as USB that directly connects to an external apparatus 6B. The external apparatus 6B may be an external storage medium, or a storage apparatus such as a database.

The external apparatuses 6A and 6B may also be output apparatuses. For example, the output apparatuses may be a display apparatus for displaying images and an apparatus that outputs sound or the like. For example, the output apparatuses may be a liquid crystal display (LCD), a cathode ray tube (CRT), a plasma display panel (PDP), or a speaker, but are not limited to the above.

Note that the external apparatuses 6A and 6B may also be input apparatuses. The input apparatuses are provided with devices such as a keyboard, a mouse, and a touch panel, and supply information inputted through these devices to the computer apparatus 4. Signals from the input apparatuses are outputted to the processor 41.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before can be configured as below, (Item 1)

An information processing apparatus comprising:
a receiver configured to receive a verification request of consistency for an object of verification, the object of verification being a handling consent record or a handling execution record related to a handling of data;
a searcher configured to search a storage system storing at least one handling consent record and at least one handling execution record on a basis of the verification request, and acquire the handling consent record or the handling execution record which is the object of verification and a handling consent record and a handling execution record related to the object of verification;
a period calculator configured to calculate at least one of a consent period or a non-consent period on a basis of at least one acquired handling consent record; and
a verifier configured to verify the consistency on a basis of at least one acquired handling execution record and at least one of the consent period or the non-consent period.

(Item 2)

The information processing apparatus according to item 1, wherein the searcher is configured to search for the handling consent record or the handling execution record which is the object of verification on a basis of a condition designated by the verification request or search for the handling consent record or the handling execution record related to the object of verification on a basis of the condition designated by the verification request.

(Item 3)

The information processing apparatus according to item 2, wherein the condition designates a value of a field included in the handling consent record or the handling execution record which is the object of verification or a value of a field included in the handling consent record or the handling execution record related to the object of verification.

(Item 4)

The information processing apparatus according to item 2 or 3, wherein the searcher is configured to search for a handling consent record or a handling execution record in which a value of a field thereof matches the value of the field designated by the verification request, in which the value of the field thereof is included by the value of the field designated by the verification request, or in which the value of the field thereof includes the value of the field designated by the verification request.

(Item 5)

The information processing apparatus according to any one of items 1 to 4, wherein the searcher is configured to acquire a first handling consent record referenced by the handling execution record and acquire a second handling consent record referenced by the first handling consent record.

(Item 6)

The information processing apparatus according to item 5, wherein
 at least one field in the handling execution record is same as a field in the first handling consent record or the second handling consent record, and the at least one field is omitted from the handling execution record, and
 the searcher is configured to specify a value of the at least one field by referencing the first handling consent record or the second handling consent record.

(Item 7)

The information processing apparatus according to any one of items 1 to 6, wherein the verifier is configured to detect an inconsistency in a case where at least one of the handling consent record or the handling execution record related to the object of verification is not acquirable from the storage system.

(Item 8)

The information processing apparatus according to any one of items 1 to 7, wherein
 one of the at least one handling consent record in the storage system is a handling consent re-record including a second identifier changed from a first identifier of a related party in the handling consent record, and
 the searcher is configured to specify the first identifier corresponding to the second identifier included in the handling consent re-record on a basis of identifier correspondence information, and search for the handling consent record including the first identifier.

(Item 9)

The information processing apparatus according to any one of items 1 to 8, wherein the storage system is a blockchain.

(Item 10)

The information processing apparatus according to any one of items 1 to 9, wherein the period calculator is configured to calculate at least one of the consent period or the non-consent period on a basis of a validity period of one or a plurality of the handling consent records.

(Item 11)

The information processing apparatus according to item 10, wherein the period calculator is configured to determine the validity period on a basis of time information included in the handling consent record.

(Item 12)

The information processing apparatus according to any one of items 1 to 11, wherein
 the storage system is a blockchain, and
 the period calculator is configured to determine the consent period or the non-consent period on a basis of an order of a plurality of blocks including the handling consent record and the handling execution record.

(Item 13)

The information processing apparatus according to any one of items 10 to 12, wherein
 the searcher is configured to acquire a plurality of handling consent records related to the handling execution record, and
 the period calculator is configured to calculate at least one of the consent period or the non-consent period on a basis of a period during which the validity period of the plurality of handling consent records overlap.

(Item 14)

The information processing apparatus according to any one of items 1 to 13, wherein
 a type of handling in the acquired handling execution record is acquisition, and
 the verifier is configured to determine whether a handling date of the handling execution record with the acquisition as the type of handling is included in the consent period, and detect an inconsistency in a case where the handling date is not included in the consent period.

(Item 15)

The information processing apparatus according to any one of items 1 to 14, wherein
 a type of handling in the acquired handling execution record is disclosure or receipt, and
 the verifier is configured to determine whether a handling date of the handling execution record with the disclosure or the receipt as the type of handling is included in the consent period, and detect an inconsistency in a case where the handling date is not included in the consent period.

(Item 16)

The information processing apparatus according to any one of items 1 to 15, wherein the verifier is configured to detect an inconsistency in a case where a handling execution record in which a handling party is a first party and a type of handling is acquisition does not exist before a handling date of the handling execution record in which a type of the handling is disclosure or receipt and a provider is the first party, or in a case where a handling execution record in which a recipient is the first party and a type of handling is receipt does not exist before a handling date of the handling execution record in which a type of the handling is disclosure or receipt and a provider is the first party.

(Item 17)

The information processing apparatus according to any one of items 1 to 16, wherein the verifier is configured to detect an inconsistency in a case where a handling execution record in which a type of the handling is deletion exists in a period from a handling date of the handling execution record in which the type of handling is acquisition or receipt and in which a handling party or a recipient is a first party to a handling date of the handling execution record in which the type of handling is disclosure or receipt and in which a provider is the first party.

(Item 18)

The information processing apparatus according to any one of items 1 to 17, wherein the verifier is configured to detect an inconsistency in a case where:
- a handling execution record in which a type of the handling is receipt, which corresponds to the handling execution record in which the type of handling is disclosure does not exist;
- a handling date of the handling execution record in which the type of handling is disclosure is different from a handling date of a handling execution record in which the type of handling is receipt, which corresponds to the handling execution record in which the type of handling is disclosure;
- a handling execution record in which the type of handling is disclosure, which corresponds to the handling execution record in which the type of handling is receipt does not exist; or
- a handling date of the handling execution record in which the type of handling is receipt is different from a handling date of a handling execution record in which the type of handling is disclosure, which corresponds to the handling execution record in which the type of handling is receipt.

(Item 19)

A non-transitory computer readable medium having a computer program stored therein which when executed by a compute, causes the computer to perform processes comprising:
- receiving a verification request of consistency for an object of verification, the object of verification being a handling consent record or a handling execution record related to a handling of data;
- searching a storage system storing at least one handling consent record and at least one handling execution record on a basis of the verification request, and acquire the handling consent record or the handling execution record which is the object of verification and a handling consent record and a handling execution record related to the object of verification;
- calculating at least one of a consent period or a non-consent period on a basis of at least one acquired handling consent record; and
- verifying the consistency on a basis of at least one acquired handling execution record and at least one of the consent period or the non-consent period.

(Item 20)

An information processing system comprising:
- a storage system storing at least one handling consent record and at least one handling execution record related to a handling of data;
- a receiver configured to receive a verification request of consistency for an object of verification, the object of verification being the handling consent record or the handling execution record;
- a searcher configured to search the storage system on a basis of the verification request, and acquire the handling consent record or the handling execution record which is the object of verification and a handling consent record and a handling execution record related to the object of verification;
- a period calculator configured to calculate at least one of a consent period or a non-consent period on a basis of at least one acquired handling consent record; and
- a verifier configured to verify the consistency on a basis of at least one acquired handling execution record and at least one of the consent period or the non-consent period.

(Item 21)

The information processing apparatus according to any one of items 1 to 9 and 13 to 18, wherein the period calculator is configured to determine the validity period on a basis of timestamp information included in the handling consent record.

(Item 22)

The information processing apparatus according to any one of items 1 to 18 and 21, wherein the searcher is configured to transmit a search request to the storage system on a basis of the verification request, and receive information about at least one of a consent period or a non-consent period as a response from the storage system.

(Item 23)

The information processing apparatus according to any one of items 1 to 18, 21, and 22, wherein
- the verification request designates a handling execution record treated as the object of verification, and
- the consent period is taken to be a period from the validity date of a first handling consent record referenced by the handling execution record treated as the object of verification until the validity date of a second handling consent record indicating a rescinding of the consent in the handling consent record.

(Item 24)

The information processing apparatus according to item 23, wherein in a case where the second handling consent record indicating a rescinding of the consent does not exist, the verifier is configured to take the consent period to be a period from the validity date of a first handling consent record referenced by the handling execution record treated as the object of verification up to the time point at which the verifier performs the verification.

(Item 25)

The information processing apparatus according to any one of items 1 to 18 and 21 to 24, wherein
- the verification request designates a handling consent record of rescinding consent treated as the object of verification,
- the verifier is configured to take a consent period with respect to the handling consent record of rescinding consent to be from the validity date of a handling consent record indicating the consent treated as the basis for rescinding consent until the validity date of the handling consent record of rescinding consent, and
- the verifier is configured to take a non-consent period to be a period from the validity date of the handling consent record of rescinding consent until a handling consent record indicating that consent is given again, (Item 26)

The information processing apparatus according to item 25, wherein in a case where the handling consent record indicating that consent is given again does not exist, the verifier is configured to take the non-consent period to be a period from the validity date of the handling consent record of rescinding consent up to the time point at which the verifier performs the verification.

(Item 27)

The information processing apparatus according to any one of items 1 to 18 and 21 to 26, wherein the verifier is configured to detect an inconsistency in a case where the handling date of the handling execution record with deletion as the type of handling is not included in the non-consent period.

(Item 28)

The information processing apparatus according to any one of items 1 to 18 and 21 to 27, wherein the verifier is configured to detect an inconsistency in a case where the handling date of the handling execution record with deletion as the type of handling is not on or after the handling date of a handling execution record of acquisition or receipt of the data to be deleted.

(Item 29)

The information processing apparatus according to any one of items 1 to 18 and 21 to 28, wherein the verifier is configured to detect an inconsistency in a case where a different handling execution record in which the type of handling is deletion exists between the handling date of the handling execution record in which the type of handling is acquisition or receipt and the handling date of the handling execution record in which the type of handling is deletion.

(Item 30)

The information processing apparatus according to any one of items 1 to 18 and 21 to 29, wherein the verifier is configured to detect an inconsistency in a case where, with respect to a handling consent record indicating the rescinding of consent, a handling execution record in which the handling date is included in the consent period and the type of handling is acquisition or receipt exists, and a handling execution record in which the handling date is included in the non-consent period and the type of handling is deletion does not exist.

(Item 31)

The information processing apparatus according to any one of items 1 to 18 and 21 to 30, wherein the verifier is configured to detect an inconsistency in a case where, with respect to a handling consent record indicating the rescinding of consent, a handling execution record in which the handling date is included in the consent period and the type of handling is acquisition or receipt does not exist, and a handling execution record in which the handling date is included in the non-consent period and the type of handling is deletion exists.

The invention claimed is:

1. An information processing apparatus comprising:
a receiver configured to receive a verification request of consistency for an object of verification, the object of verification being a handling consent record or a handling execution record related to a handling of data;
a searcher configured to search a storage system storing at least one handling consent record and at least one handling execution record on a basis of the verification request, and acquire the handling consent record or the handling execution record which is the object of verification and a handling consent record and a handling execution record related to the object of verification;
a period calculator configured to calculate at least one of a consent period or a non-consent period on a basis of at least one acquired handling consent record; and
a verifier configured to verify the consistency on a basis of at least one acquired handling execution record and at least one of the consent period or the non-consent period,
wherein
one of the at least one handling consent record in the storage system is a handling consent re-record including a second identifier changed from a first identifier of a related party in the handling consent record, and the searcher is configured to specify the first identifier corresponding to the second identifier included in the handling consent re-record on a basis of identifier correspondence information, and search for the handling consent record including the first identifier.

2. The information processing apparatus according to claim 1, wherein the searcher is configured to search for the handling consent record or the handling execution record which is the object of verification on a basis of a condition designated by the verification request or search for the handling consent record or the handling execution record related to the object of verification on a basis of the condition designated by the verification request.

3. The information processing apparatus according to claim 2, wherein the condition designates a value of a field included in the handling consent record or the handling execution record which is the object of verification or a value of a field included in the handling consent record or the handling execution record related to the object of verification.

4. The information processing apparatus according to claim 2, wherein the searcher is configured to search for a handling consent record or a handling execution record in which a value of a field thereof matches the value of the field designated by the verification request, in which the value of the field thereof is included by the value of the field designated by the verification request, or in which the value of the field thereof includes the value of the field designated by the verification request.

5. The information processing apparatus according to claim 1, wherein the searcher is configured to acquire a first handling consent record referenced by the handling execution record and acquire a second handling consent record referenced by the first handling consent record.

6. The information processing apparatus according to claim 5, wherein
at least one field in the handling execution record is same as a field in the first handling consent record or the second handling consent record, and the at least one field is omitted from the handling execution record, and the searcher is configured to specify a value of the at least one field by referencing the first handling consent record or the second handling consent record.

7. The information processing apparatus according to claim 1, wherein the verifier is configured to detect an inconsistency in a case where at least one of the handling consent record or the handling execution record related to the object of verification is not acquirable from the storage system.

8. The information processing apparatus according to claim 1, wherein the storage system is a blockchain.

9. The information processing apparatus according to claim 1, wherein the period calculator is configured to calculate at least one of the consent period or the non-consent period on a basis of a validity period of one or a plurality of the handling consent records.

10. The information processing apparatus according to claim 9, wherein the period calculator is configured to determine the validity period on a basis of time information included in the handling consent record.

11. The information processing apparatus according to claim 9, wherein
the searcher is configured to acquire a plurality of handling consent records related to the handling execution record, and
the period calculator is configured to calculate at least one of the consent period or the non-consent period on a basis of a period during which the validity period of the plurality of handling consent records overlap.

12. The information processing apparatus according to claim 1, wherein
the storage system is a blockchain, and
the period calculator is configured to determine the consent period or the non-consent period on a basis of an order of a plurality of blocks including the handling consent record and the handling execution record.

13. The information processing apparatus according to claim 1, wherein
a type of handling in the acquired handling execution record is acquisition, and
the verifier is configured to determine whether a handling date of the handling execution record with the acquisition as the type of handling is included in the consent period, and detect an inconsistency in a case where the handling date is not included in the consent period.

14. The information processing apparatus according to claim 1, wherein
a type of handling in the acquired handling execution record is disclosure or receipt, and
the verifier is configured to determine whether a handling date of the handling execution record with the disclosure or the receipt as the type of handling is included in the consent period, and detect an inconsistency in a case where the handling date is not included in the consent period.

15. The information processing apparatus according to claim 1, wherein the verifier is configured to detect an inconsistency in a case where a handling execution record in which a handling party is a first party and a type of handling is acquisition does not exist before a handling date of the handling execution record in which a type of the handling is disclosure or receipt and a provider is the first party, or in a case where a handling execution record in which a recipient is the first party and a type of handling is receipt does not exist before a handling date of the handling execution record in which a type of the handling is disclosure or receipt and a provider is the first party.

16. The information processing apparatus according to claim 1, wherein the verifier is configured to detect an inconsistency in a case where a handling execution record in which a type of the handling is deletion exists in a period from a handling date of the handling execution record in which the type of handling is acquisition or receipt and in which a handling party or a recipient is a first party to a handling date of the handling execution record in which the type of handling is disclosure or receipt and in which a provider is the first party.

17. The information processing apparatus according to claim 1, wherein the verifier is configured to detect an inconsistency in a case where:
a handling execution record in which a type of the handling is receipt, which corresponds to the handling execution record in which the type of handling is disclosure does not exist;
a handling date of the handling execution record in which the type of handling is disclosure is different from a handling date of a handling execution record in which the type of handling is receipt, which corresponds to the handling execution record in which the type of handling is disclosure;
a handling execution record in which the type of handling is disclosure, which corresponds to the handling execution record in which the type of handling is receipt does not exist; or
a handling date of the handling execution record in which the type of handling is receipt is different from a handling date of a handling execution record in which the type of handling is disclosure, which corresponds to the handling execution record in which the type of handling is receipt.

18. A non-transitory computer readable medium having a computer program stored therein which when executed by a compute, causes the computer to perform processes comprising:
receiving a verification request of consistency for an object of verification, the object of verification being a handling consent record or a handling execution record related to a handling of data;
searching a storage system storing at least one handling consent record and at least one handling execution record on a basis of the verification request, and acquire the handling consent record or the handling execution record which is the object of verification and a handling consent record and a handling execution record related to the object of verification;
calculating at least one of a consent period or a non-consent period on a basis of at least one acquired handling consent record; and
verifying the consistency on a basis of at least one acquired handling execution record and at least one of the consent period or the non-consent period,
wherein
one of the at least one handling consent record in the storage system is a handling consent re-record including a second identifier changed from a first identifier of a related party in the handling consent record, and
the searching a storage system specify the first identifier corresponding to the second identifier included in the handling consent re-record on a basis of identifier correspondence information, and search for the handling consent record including the first identifier.

19. An information processing system comprising:
a storage system storing at least one handling consent record and at least one handling execution record related to a handling of data;
a receiver configured to receive a verification request of consistency for an object of verification, the object of verification being the handling consent record or the handling execution record;
a searcher configured to search the storage system on a basis of the verification request, and acquire the handling consent record or the handling execution record which is the object of verification and a handling consent record and a handling execution record related to the object of verification;
a period calculator configured to calculate at least one of a consent period or a non-consent period on a basis of at least one acquired handling consent record; and
a verifier configured to verify the consistency on a basis of at least one acquired handling execution record and at least one of the consent period or the non-consent period, wherein
one of the at least one handling consent record in the storage system is a handling consent re-record including a second identifier changed from a first identifier of a related party in the handling consent record, and the searcher is configured to specify the first identifier corresponding to the second identifier included in the handling consent re-record on a basis of identifier correspondence information, and search for the handling consent record including the first identifier.

\* \* \* \* \*